United States Patent [19]
Mito

[11] Patent Number: 5,946,215
[45] Date of Patent: Aug. 31, 1999

[54] MACHINE TOOL CONTROLLING NETWORK COMMUNICATION CONTROLLING SYSTEM

[75] Inventor: Junichi Mito, Tokyo, Japan

[73] Assignee: Mitsubishi Denki Kabushiki Kaisha, Tokyo, Japan

[21] Appl. No.: 08/786,452

[22] Filed: Jan. 21, 1997

[30] Foreign Application Priority Data

Jan. 23, 1996 [JP] Japan .................................. 8-009200

[51] Int. Cl.⁶ .................................................. B23Q 37/00
[52] U.S. Cl. ................................ 364/474.11; 364/474.22
[58] Field of Search ......................... 364/474.22, 474.23

[56] References Cited

U.S. PATENT DOCUMENTS

| | | | |
|---|---|---|---|
| 4,249,243 | 2/1981 | Yoshida | 364/474 |
| 5,126,956 | 6/1992 | Komiya | 364/474.22 |
| 5,323,385 | 6/1994 | Jurewicz | 370/43 |
| 5,453,933 | 9/1995 | Wright | 364/474.23 |
| 5,596,437 | 1/1997 | Heins | 359/144 |

FOREIGN PATENT DOCUMENTS

| | | |
|---|---|---|
| 60-54012 | 3/1985 | Japan . |
| 61-150008 | 7/1986 | Japan . |
| 336643 | 2/1991 | Japan . |
| 4199307 | 7/1992 | Japan . |
| 511813 | 1/1993 | Japan . |
| 695729 | 4/1994 | Japan . |
| 6290128 | 10/1994 | Japan . |

OTHER PUBLICATIONS

The McGraw–Hill PC Programmer's Desk Reference Maria P. Canton/Julio Sanchez 1995 pp. 201–202.

*Primary Examiner*—Thomas R. Peeso
*Attorney, Agent, or Firm*—Sughrue, Mion, Zinn, Macpeak & Seas, PLLC

[57] ABSTRACT

In a system that connects a numerical controller (NC) unit to an operation board and to a plurality of remote I/Os with serial communication lines, the control method of the serial communication line between the NC unit and the operation board is similar to the control method of the serial communication line between the NC unit and the remote I/Os, so that the operation board can at times use the same communication lines as the remote I/Os to improve the flexibility of the system. The frame length and communication interval of data transmitted/received between the NC unit and the operation board are the same as those of data transmitted/received between the NC unit and the remote I/O. The operation board and the remote I/O can thus be connected to a common communication controlling portion of the NC unit.

21 Claims, 24 Drawing Sheets

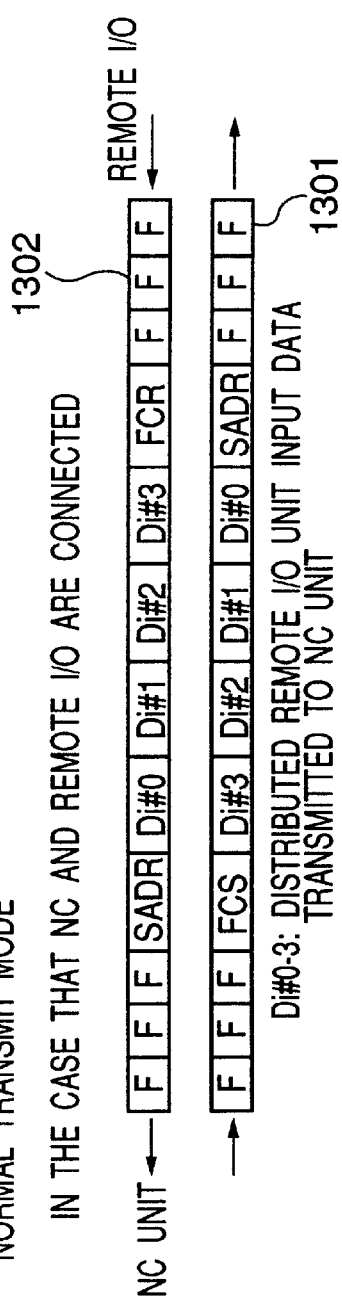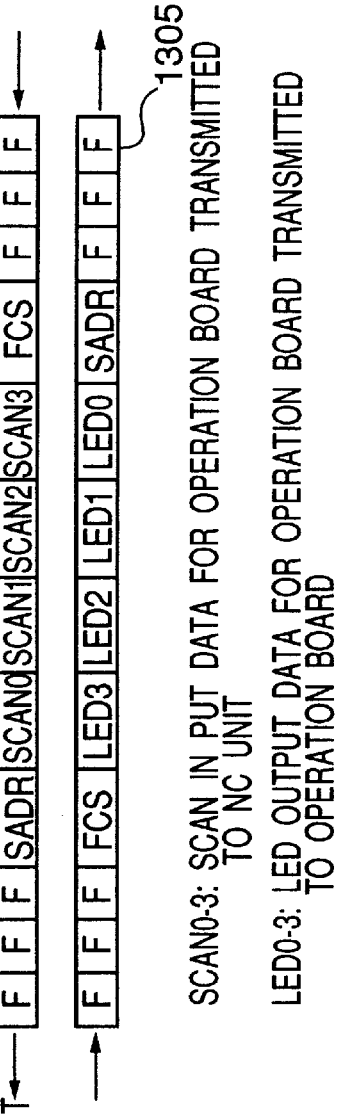
FIG. 12A
FIG. 12
FIG. 12A
FIG. 12B

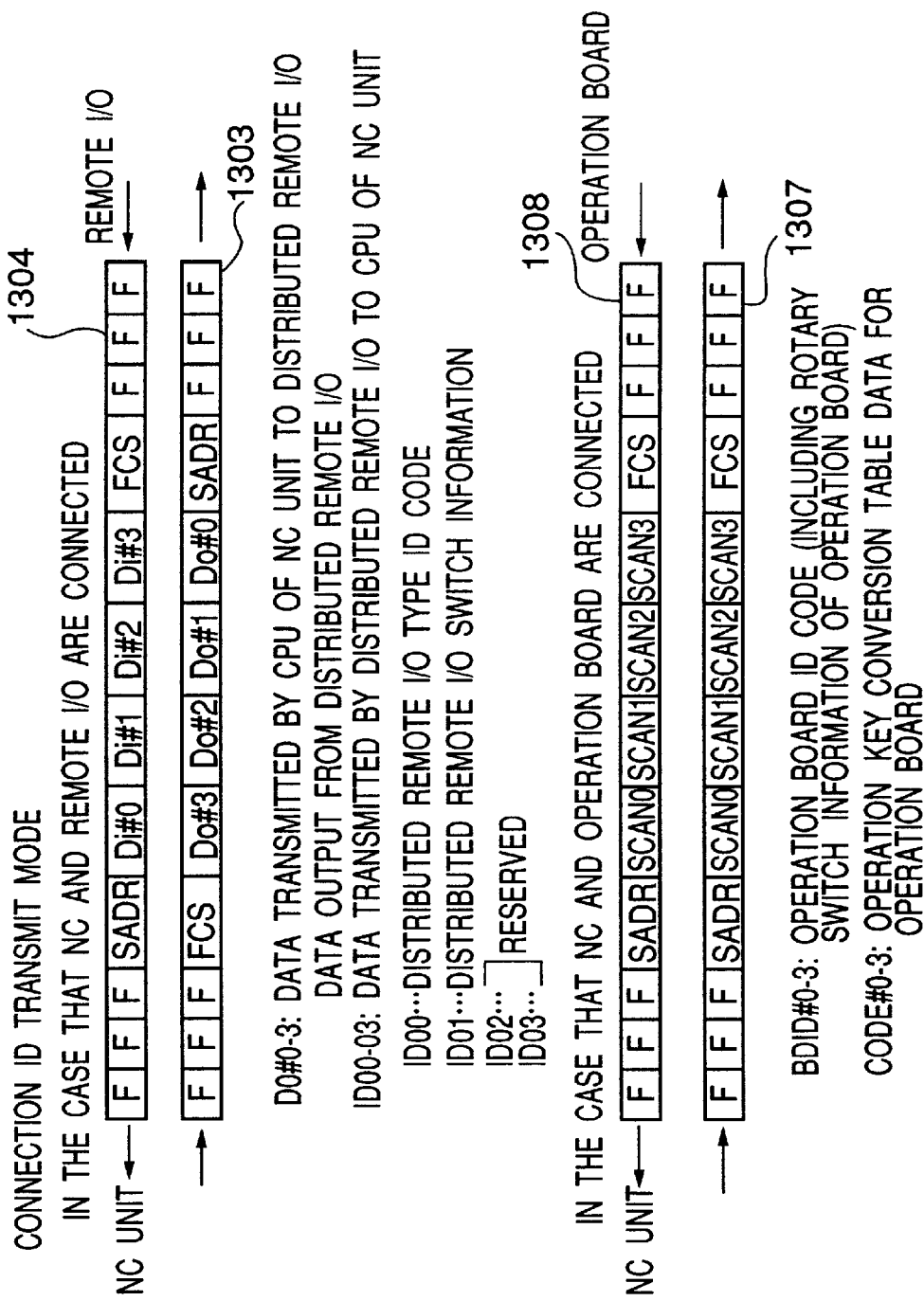

FIG.13

HEADER PATTERNS TRANSMITTED BY NC UNIT

NORMAL TRANSMIIT MODE
FF00~FF07

CONNECTION ID REQUEST
COMMUNICATION MODE
4900~4907

LOOP-BACK MODE
4C00~4C07

OPERATION BOARD CODE CONVERSION
TABLE TRANSMIT MODE
5400~5407

WHEN REMOTE I/O IS CONNECTED, HEADER PATTERN SHOULD ACCORD WITH STATION NUMBER SWITCH OF REMORT I/O
(IN THE CASE THAT THA NUMBER OF REMOTE I/O DEVICES IS EIGHT)
WHEN OPERATION BOARD IS CONNECTED, HEADER PATTERN IS USED AS ADDRESS POINTER OF CODE CONVERSION TABLE MEMORY

HEADER PATTERNS TRANSMITTED BY REMOTE I/O

1) IN THE CASE THAT TRANSMIT FRAME TRANSMITTED FROM NC UNIT HAS BEEN CORRECTLY RECEIVED BY REMOTE I/O → 5200
2) IN THE CASE THAT TRANSMIT FRAME TRANSMITTED FROM NC UNIT HAS NOT BEEN CORRECTLY RECEIVED BY REMOTE I/O → 4500
(CRC ERROR TAKES PLACE IN REMOTE I/O)
3) IN THE CASE THAT REMOTE I/O REMOVING SWITCH OF → 4A00
REMOTE I/O IS TURNED ON

NOTE) HEADER PATTERNS TRANSMITTED BY REMOTE I/O DEVICES ARE THE SAME REGARDLESS OF STATION NUMBERS OF REMOTE I/O DEVICES. AFTER COMMUNICATION CONTROLLING PORTION OF NC UNIT HAS TRANSMITTED TRANSMIT FRAME TO REMOTE I/O WITH PARTICULAR STATION NUMBER, IT DETERMINES THAT RECEIVE FRAME IS RECEIVED FROM REMOTE I/O WITH PARTICULAR STATION NUMBER

HEADER PATTERNS TRANSMITTED BY OPERATION BOARD

1) IN THE CASE THAT TRANSMIT FRAME TRANSMITTED BY NC UNIT HAS NOT BEEN CORRECTLY RECEIVED BY OPERATION BOARD → 4200
2) IN THE CASE THAT TRANSMIT FRAME TRANSMITTED BY NC UNIT HAS NOT BEEN CORRECTLY RECEIVED BY REMOTE I/O (CRC ERROR TAKES PLACE IN REMOTE I/O) → 6500
3) IN THE CASE THAT ONE OPERATION BOARD CODE CONVERSION TABLE HAS BEEN NORMALLY RECEIVED → 4600
4) IN THE CASE THAT OPERATION BOARD REMOVING SWITCH OF OPERATION BOARD IS TURNED ON → 4A00

5,946,215

MACHINE TOOL CONTROLLING NETWORK COMMUNICATION CONTROLLING SYSTEM

BACKGROUND OF THE INVENTION

The present invention relates to an operation board—remote I/O communication controlling system, and in particular to an operation board—remote I/O communication controlling system having an operation board that communicates with a controlling unit such as an NC (numerical controller) unit, a PC (programmable controller) unit, or the like, and a remote I/O that communicates with the controlling unit and that has an I/O portion for a machine connected to the controlling unit. In addition, the present invention is directed to an operation board—remote I/O communication controlling system with improved flexibility of connections between the controlling unit and the operation board and between the controlling unit and the remote I/O.

FIG. 16 is a block diagram showing a structure of a conventional operation board—remote I/O communication controlling system. FIG. 16 shows the structure of connections of an NC unit as a controlling unit, remote I/Os, an operation board, and servo amplifiers/spindle amplifiers.

MPU 101 controls the entire NC unit 1, using an operation program stored in ROM 102. RAM 103 is used as an operation work area for MPU 101. The communication controlling portion 104 is disposed in the NC unit 1 and communicates between the NC unit 1 and the operation board 3. The communication controlling portion 105 communicates between the NC unit 1 and the remote I/Os 2. The communication controlling portion 106 communicates between the NC unit 1 and the servo amplifiers/spindle amplifiers 4.

Operation boards 3 include operation key switches 107 and a display portion 108. Transmit/receive signal line 111 is connected between the NC unit 1 and the remote I/Os 2, transmit/receive signal line 112 is connected between the operation board 3 and the NC unit 1, and transmit/receive signal line 113 is connected between the servo amplifiers/spindle amplifiers 4 and the NC unit 1.

FIG. 17 shows an outlined structure of the conventional operation board 3. MPU 21 controls the entire operation board 3. The communication controlling portion 22 communicates with the NC unit 1. ROM 23 stores program software for controlling the operation of the MPU 21. RAM 24 is used as an operation work area of the MPU 21 of the operation board 3. The LED output storing portion 25 is used to output data to the LED display devices 108 of the operation board 3. The scan address generating portion 26 generates an address at which an operation key of the operation board 3 is scanned. The scan data input portion 27 inputs data of an operation key scanned corresponding to an address generated by the scan address generating portion 26. Reference numeral 28 is a switch/LED matrix on the operation board operated by the operator. Reference numeral 29 is an operation board selecting switch for selecting the type of the operation board 3.

FIG. 18 shows an outlined structure of the conventional remote I/O. Transmitting portion 31 transmits data from the remote I/O 2 to the NC unit 1. Receiving portion 32 receives data transmitted from the NC unit 1 to the remote I/O 2. Transmit data storing portion 33 stores data transmitted from the transmitting portion 31. Receive data storing portion 34 stores data received by the receiving portion 32. Filter portion 35 filters a remote I/O input signal that is input to the remote I/O 2. Remote I/O output signal storing portion 36 stores a remote I/O output signal that is input from the receive data storing portion 34. Receive alarm detecting portion 37 receives a receive state signal from the receiving portion 32 and outputs a reset signal to the output signal storing portion 36 when a non-receive state continues for a predetermined time period. Remote I/O station number designating rotary switch 38 designates a station number of the remote I/O 2. In the structure of the remote I/O 2 shown in FIG. 2, input/output signals are input and output to/from the remote I/O 2 and data is transmitted and received to/from the NC unit 1. The remote I/O 2 is composed of the communication controlling portion.

FIG. 19 is a block diagram showing an outlined structure of a communication controlling portion 104 for the operation board. The communication controlling portion 104 is disposed in the conventional NC unit 1.

As shown in FIG. 19, transmitting portion 41 transmits data from the NC unit 1 to the operation board 3. Receiving portion 42 receives data transmitted from the operation board 3 to the NC unit 1. Transmit data storing portion 43 stores data transmitted from the transmitting portion 41 to the operation board 3. Receive data storing portion 44 stores data received from the operation board 3. Transmit start command controlling portion 45 outputs a transmit start command with which the MPU 101 of the NC unit 1 causes the transmitting portion 41 to transmit data. Transmit status controlling portion 46 is used by the MPU 101 of the NC unit 1 to monitor the transmit status of the transmitting portion 41. Receive start command controlling portion 47 outputs a receive start command with which the MPU 101 causes the receiving portion to receive data. Receive status controlling portion 48 is used by the MPU 101 to monitor the receive status.

As shown in FIGS. 16 to 19, data transmission/reception between the NC unit 1 and the operation board 3 and data transmission/reception between the NC unit 1 and the remote I/O 2 are independently performed. The NC unit 1 and the remote I/O 2 are serially connected. In addition, as with the NC unit 1, the operation board 3 is controlled by the MPU 21 of the operation board 3 corresponding to software. Software processes of the MPU 21 of the operation board 3 include a process for transmitting input data of the operation keys 107 performed by the operator to the NC unit 1 and a process for outputting data transmitted from the NC unit 1 to the LED display devices 108 so as to inform the operator of the status of the NC unit 1.

As shown in FIG. 18, the remote I/O 2 is composed of the communication controlling portion. Unlike with the NC unit 1 and the operation board 3, the operation of the remote I/O 2 is not controlled by an MPU.

Next, the operation of the operation board in the conventional operation board—remote I/O communication controlling system shown in FIGS. 16 to 19 will be described. The remote I/O does not have an MPU. The operation of the remote I/O is not controlled by the MPU. Thus, the remote I/O is operated as the communication controlling portion. The remote I/O is controlled by the NC unit 1.

FIG. 20 shows an operational flow of a program software process of the MPU 101 of the conventional NC unit 1. FIG. 21 shows an operational flow of a program software process of the MPU 101 of the conventional NC unit 1 for inputs/outputs with the operation board 3 and the remote I/O 2. FIG. 22 shows an operational flow of a program software process of a controlling MPU 21 of the operation board 3.

Generally, a machine tool that uses an NC unit is equipped with an operation board corresponding to features of the machine tool. Thus, there are many types of operation boards. When the system of the NC unit is started, the operation board used for the machine tool has not been detected.

Thus, as shown in FIG. 20, when the system of the NC unit 1 is started, the MPU 101 of the NC unit 1 generates a frame with which the NC unit 1 requests the status of the operation board 3 (at step S1). In other words, the MPU 101 generates a frame for detecting what type of an operation board has been connected to the NC unit 1. At step S2, the MPU 101 of the NC unit 1 transmits the generated frame to the operation board 3. The operation board 3 receives the frame and transmits a frame containing status information corresponding to the received frame to the NC unit 1. The NC unit 1 receives the frame at step S3. The NC unit 1 analyzes the received status information (at step S4). The NC unit 1 executes an operation key input process for the operation board 3 corresponding to the analyzed result and a data output process for data to LED display devices 108 of the operation board 3 (at step S5).

After the NC unit 1 has analyzed the status for the type of the operation board 3, the mode of the MPU 101 of the NC unit 1 is changed from the status request mode to the normal mode. The operation board 3 generates and transmits a normal transmit frame to the LED display devices 108 (at step S6). In addition, the operation board 3 receives a frame containing input data of the operation keys 107 from the operation board 3 (at step S7). Whenever the MPU 101 of the NC unit 1 receives a frame, it analyzes the receive status and the receive data. In addition, the MPU 101 generates and transmits a normal transmit frame containing data that is output to the LED display devices 108 of the operation board 3 (at step S8). The operation mode of the NC unit 1 is changed corresponding to the input data of the operation keys 107 of the operation board 3. The NC unit 1 transmits data to the LED display devices 108 corresponding to the operation mode.

FIG. 21 shows an operational flow of a program software process of the MPU 101 of the NC unit 1 for inputs/outputs with the operation board 3 and the remote I/O 2. The NC unit 1 cyclically communicates with the operation board 3 and the remote I/O 2.

In other words, corresponding to a cyclic timer interrupt, the NC unit 1 performs the input/output process for the operation board 3 corresponding to the flow shown in FIG. 20 (at step S61). Thereafter, the NC unit 1 performs the normal input/output process for the remote I/O (at step S62). After that, the NC unit 1 performs another process (at step S63). Thereafter, the NC unit 1 returns from the interrupt process routine.

Next, with reference to a program software process flow of the MPU 21 of the operation board 3 shown in FIG. 22, the operation of the MPU 21 will be described.

When the system is started, the MPU 21 initializes the inside thereof and the input/output ports 25 and 27, and the communication controlling portion 22 reads switch information from the operation keys 107 of the operation board 3, and enters a receive waiting state in which the MPU 21 waits for a frame from the NC unit 1 (at step S2 1). When the MPU 21 detects that a frame has been received from the NC unit 1 (at step S22), the MPU 21 determines whether or not the frame has been correctly received (at step S23). When the frame has been correctly received, the MPU 21 stores display output data for the LED display devices 108 to the output storing portion 25 and sets a normal receive status to the frame to be transmitted to the NC unit 1 (at step S24). When the MPU 21 detects a receive error, it sets a receive error status to a frame to be transmitted to the NC unit 1 (at step S25).

Next, the MPU 21 determines whether or not the frame received from the NC unit 1 represents a connection ID request communication mode in which the NC unit 1 requests the MPU 21 to reply with the type of the connected operation board or a normal transmit mode (at step S26). When the frame represents the connection ID request communication mode, the MPU 21 generates the connection ID transmit frame that contains the status information (at step S27), transmits the frame to the NC unit 1 (at step S28), and enters the receive waiting state (at step S22).

When the frame transmitted from the NC unit 1 is a normal transmit frame, the MPU 21 stores the display output data for the LED display devices 108 to the LED output storing portion 25 of the operation board 3 (at step S29), generates the normal transmit frame for the NC unit 1 corresponding to the input data of the operation keys 107 of the operation board 3 (at step S30), transmits the normal transmit frame to the NC unit 1 (at step S31), and enters the data receive waiting state (at step S22).

In other words, when the operation board 3 detects a frame that has been transmitted from the NC unit 1 to the operation board 3, the MPU 21 determines whether or not the frame is a connection ID request communication frame or a normal transmit frame. This determination is performed with an identification code contained in the frame (this identification code is hereinafter referred to as a header pattern). When the frame detected by the MPU 21 is the connection ID request communication frame, the MPU 21 generates a transmit frame that contains the receive status (that is a normal receive status or a receive error detection status) and the status information of the operation board 3 and transmits the transmit frame to the NC unit 1. On the other hand, when the operation board 3 receives the normal transmit frame that is free of a CRC error, the MPU 21 stores an output signal for the LED display devices 108 to the LED output storing portion 25 of the operation board 3 and sets a normal receive status. When the receive frame contains a CRC error, the MPU 21 sets the receive error detection status. Thereafter, the MPU 21 places input information of which the scan data input portion 27 has scanned the operation keys 107 of the operation board 3 into the transmit frame along with the normal receive status or the receive error detection status, and transmits the resultant frame to the NC unit 1. After the MPU 21 has completely transmitted the transmit frame, it enters the receive waiting state. When the NC unit 1 receives a frame from the operation board 3, the MPU 21 repeats the above-described operations.

Next, the operation board 3, the remote I/O 2, and the communication controlling portion of the NC unit 1 shown in FIGS. 17, 18, and 19 will be supplementally described. In the process of which the MPU 101 of the NC unit 1 transmits a frame that requests the status for the operation board 3 to the communication controlling portion for the operation board (at steps S1 and S2 of FIG. 20), data to be transmitted to the transmit data storing portion 43 is prepared beforehand. In addition to a process for writing a transmit start command to the transmit start command controlling portion 45, as a preparation for receiving a frame transmitted from the operation board 3, a receive start command is written to the receive start command controlling portion 47 beforehand.

In the outlined structure of the operation board 3 shown in FIG. 17, as the output process of which the MPU 21 of the operation board outputs data to the LED display devices 108 (at step S29 of FIG. 22), the MPU 21 stores LED output data to the LED output storing portion 25 of the operation board. In the operation key input process (at step S30 of FIG. 22), the MPU 21 sets a scan address to the scan address generating portion 26 of the operation board. The MPU 21 reads input data of the operation keys 107 from the scan data input portion 27 of the operation board.

In the above described conventional system, the communication control performed between the NC unit 1 and the operation board 3 is completely different from the communication control performed between the NC unit 1 and the remote I/O 2. The NC unit 1 is equipped with the dedicated communication controlling portion 104 and the dedicated transmit/receive signal line 112 for the operation board 3. Likewise, the NC unit 1 is equipped with the dedicated communication controlling portion 105 and the dedicated transmit/receive signal line 111 for the remote I/O 2. Thus, the NC unit 1 requires two types of serial signal lines that are dedicated, not flexible. In particular, when a machine tool is controlled, an operation board 3 is only temporarily used. In other words, when the machine tool is normally operated, it is not necessary to connect the operation board 3 thereto. Thus, such dedicated signal lines deteriorate the flexibility of the system structure.

In the conventional system, the NC unit 1 is equipped with the MPU 101. In addition, to accomplish the function of the operation board 3, the operation board 3 is equipped with MPU 21 that operates under the control of program software. Thus, the operation board 3 must have the dedicated MPU 21 and memories 23 and 24, which are necessary for the operation of the MPU 21. Consequently, the hardware cost of the operation board 3 is high.

In addition, in the conventional system, when input data from the operation keys 107 of the operation board 3 is transmitted to the NC unit 1, the MPU 21 performs a blinking control process for the LED display devices 108 to confirm the operation of the NC unit 1. To control the operation, the dedicated software must be developed. This conventional approach is both expensive and susceptible to software bug problems.

In the conventional system, code conversion table data for transmitting input data from the operation keys 107 of the operation board 3 to the NC unit 1 is stored in the memory ROM 23 of the operation board 3. When a frame is transmitted to the NC unit 1, the data is converted into a format of which the NC unit 1 can read. Each operation board 3 has code conversion table data. Thus, it is very troublesome to manage the data.

In a numerical control (NC) unit disclosed in Japanese Patent Laid-Open Publication No. 60-54012, an NC operation board and a machine operation board are selectively connected to the same interface of the NC unit. This related art reference discloses selecting the NC operation board and the machine operation board, however, no improvement is made for the NC operation board itself. In addition, no communication controlling system is defined, thus, the unit suffers from a lack of flexibility.

SUMMARY OF THE INVENTION

The present invention is made to solve the above-described problems of the conventional operation board—remote I/O communication controlling systems. An object of the present invention is to flexibly connect a controlling unit such as an NC unit and an operation board or a remote I/O so as to improve the flexibility of the system structure.

Another object of the present invention is to provide an operation board—remote I/O communication controlling system of which the operation board is processed by a communication controlling portion so as to reduce the size and cost of the operation board and thereby reduce the size and cost of the entire system.

Another object of the present invention is to remove a controlling MPU of the operation board so as to reduce the work load for developing program software, reduce the size of the operation board, flexibly handle a system that does not have an operation board, improve the reliability of the operation board controlling system, and reduce the cost of the system.

Another object of the present invention is to provide an operation board—remote I/O communication controlling system that can totally manage code conversion table data and system software of a controlling unit with the same memory.

Another object of the present invention is to provide an operation board—remote I/O communication controlling system of which a serial signal connecting portion of a controlling unit and an operation board is used for a serial signal connecting portion for a remote I/O when the operation board is not used.

To accomplish the above objects, the present invention provides an operation board—remote I/O communication controlling system having an operation board or a remote I/O in association with a controlling unit for controlling a machine tool, the frame length (typically several bytes) and communication intervals of data transmitted/received between the controlling unit and the operation board being the same as the frame length and communication intervals of data transmitted/received between the controlling unit and the remote I/O. The operation board or the remote I/O can therefore be connected to the same serial communication line of the controlling unit.

The controlling unit is an NC unit. Data transmitted/received between the NC unit and the operation board is performed by transmitting display data from the NC unit to a display portion of the operation board and by transmitting operation key input data from the operation board to the NC unit. A frame transmitted from the operation board to the NC unit has a different identification code from that of a frame transmitted from the remote I/O to the NC unit.

A communication controlling portion of the controlling unit is adapted for transmitting a communication frame that detects the type of an operation board connected to the controlling unit when an operation board removing switch or a connected device removing switch is operated so as to remove the operation board from the controlling unit or when the connected device removing switch or a remote I/O removing switch is operated so as to remove the remote I/O from the controlling unit.

An address signal of which operation key input data of the operation board is scanned and read depends on the frame identification code transmitted from the NC unit to the operation board. The operation key input data is transmitted to the NC unit when a frame is transmitted from the NC unit to the operation board.

The communication controlling portion of the NC unit is adapted for transmitting a communication frame for detecting the type of operation board connected to the NC unit, the operation board being adapted for transmitting information representing the type thereof to the NC unit, and the NC unit being adapted for transmitting code conversion table data corresponding to the operation key input data to the operation board based on the transmitted information and storing the code conversion table data in a memory of the operation board's memory.

The communication controlling portion has a first mode for extracting a highest priority operation key, converting the highest priority operation key into a code corresponding to the code conversion table data stored in the memory of the operation board, and transmitting the converted data to the NC unit and a second mode for directly transmitting the input data of the operation key to the NC unit when a plurality of operation keys are operated in the case that a frame is transmitted from the NC unit to the operation board and the operation key input data of the operation board is scanned and read.

The code conversion table data is transmitted from the NC unit to the operation board in such a manner that the code conversion table data is divided into a plurality of frames. The address of the code conversion table data stored in the memory depends on the identification code of each of the frames.

The operation board is adapted for transmitting a frame that has a special identification code to the NC unit whenever the code conversion table data is normally transmitted as a plurality of frames from the NC unit.

The identification code of a frame transmitted from the NC unit is restored to a normal identification code in the case that the code conversion table data is transmitted as a plurality of frames from the NC unit, when the identification code of each of the frames is transmitted with a special identification code and the NC unit receives a frame that represents the normal transmission of the code conversion table data from the operation board.

An address displayed on the display portion of the operation board depends on the identification code of a frame of the display data transmitted from the NC unit to the operation board.

BRIEF DESCRIPTION OF THE DRAWINGS

In the accompanying of the Drawings

FIGS. 12A and 12B are schematic diagrams showing a structure of a frame transmitted and received between the NC unit and the remote I/O and a structure of a frame transmitted and received between the NC unit and the operation board according to the embodiment;

FIG. 13 is a schematic diagram for explaining header patterns transmitted from communication controlling portions of the NC unit, the operation board, and the remote I/O;

DETAILED DESCRIPTION OF PREFERRED EMBODIMENTS

First Embodiment

Figure 1:
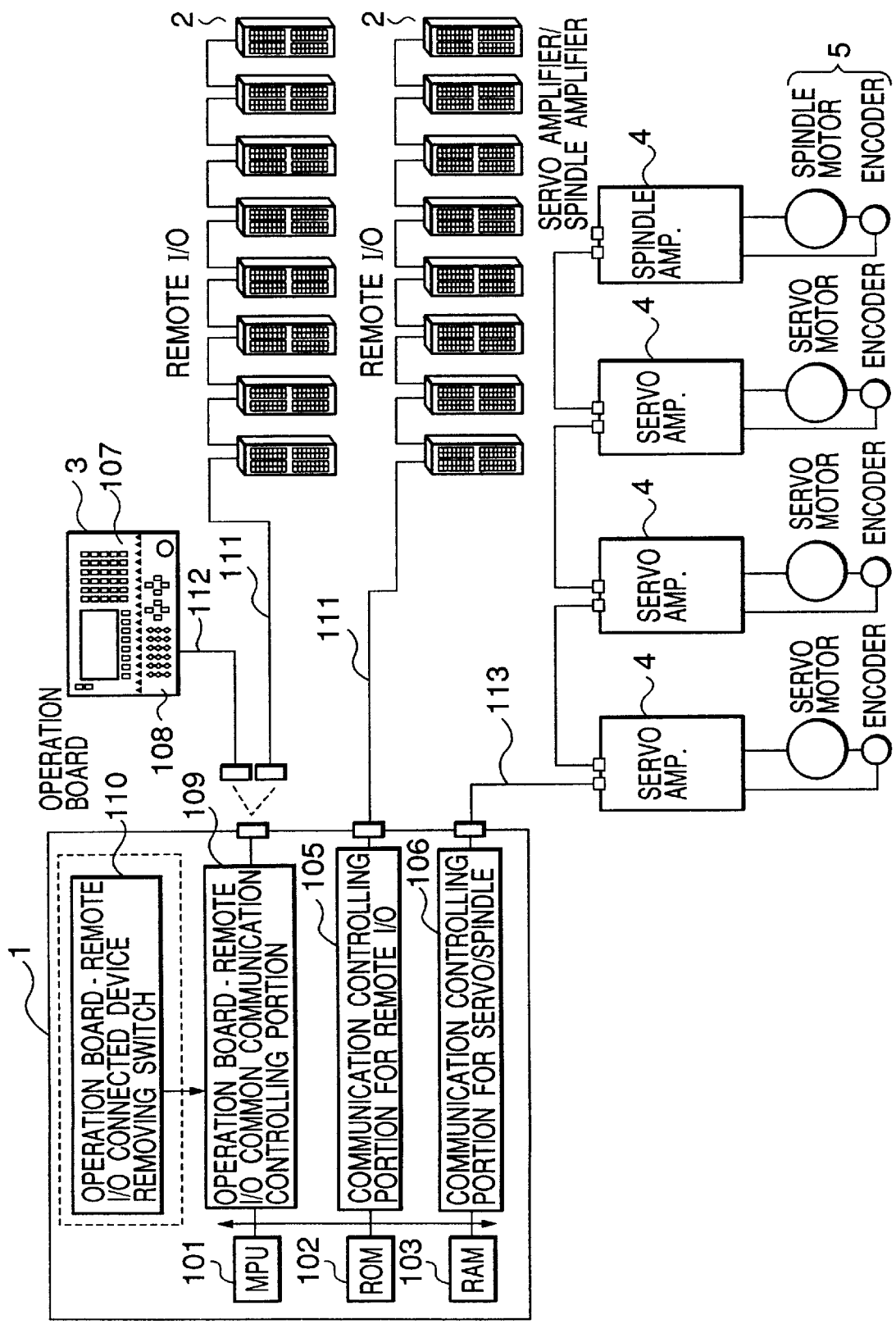
FIG. 1 is a block diagram showing an example of the structure of an operation board—remote I/O communication controlling system according to the present invention.

FIG. 1 is a block diagram showing a structure of an operation board—remote I/O communication controlling system according to a first embodiment of the present invention.

In the first embodiment shown in FIG. 1, an NC unit 1 is used as a controlling unit. In FIG. 1, reference numeral 109 is an operation board—remote I/O common communication controlling portion provided within the NC unit 1. The operation board—remote I/O common communication controlling portion 109 is connected to a remote I/O 2 through a transmit/receive signal line 111 or to an operation board 3 through a transmit/receive signal line 112. Of course, while lines 111 and 112 are often physically embodied as wires or cables, other communication links, such as wireless radio links, may be used as well. The operation board—remote I/O connected device removing switch 110 is used to remove a device connected to either the operation board 3 or the remote I/O 2.

Figure 16:
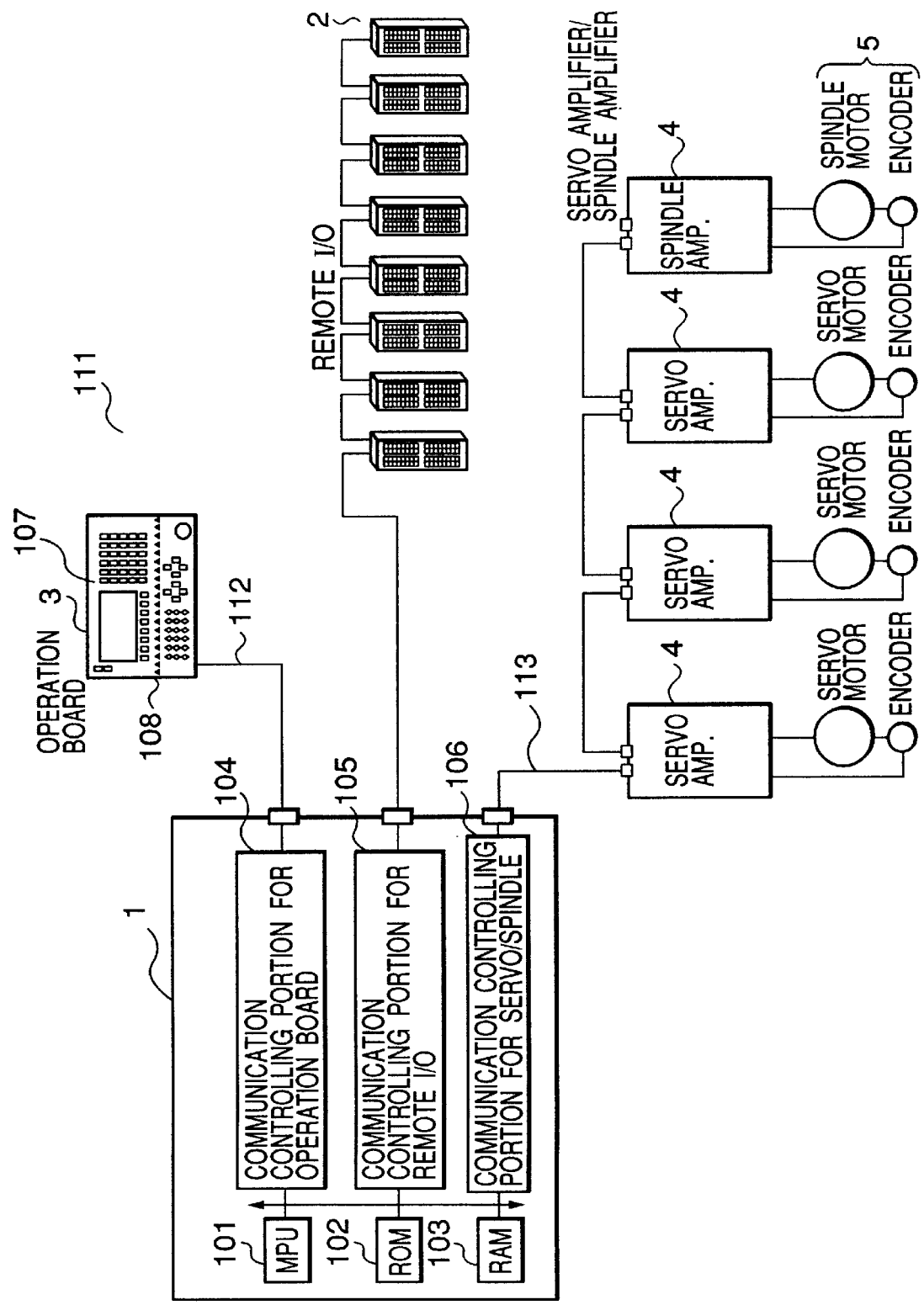
FIG. 16 is a block diagram showing a structure of a conventional operation board—remote I/O communication controlling system.

Since FIG. 1 is a block diagram, the detailed operation of each portion of the system shown in FIG. 1 will be described in the following. In FIG. 1, similar portions to those in the related art reference shown in FIG. 16 are denoted by similar reference numerals.

Figure 2:
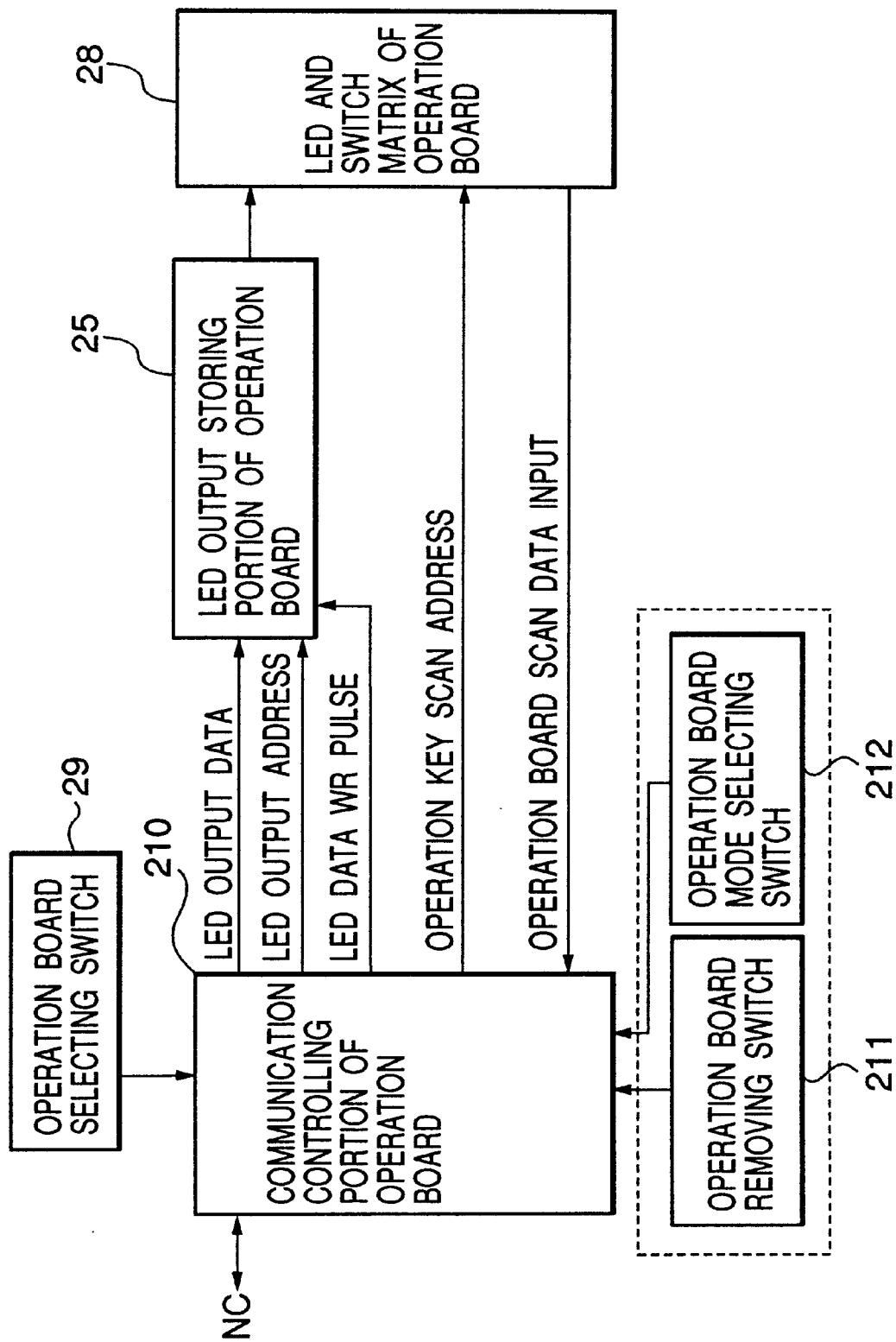
FIG. 2 is a block diagram showing an outlined structure of an operation board for use with the operation board—remote I/O communication controlling system according to the present invention.
Figure 17:
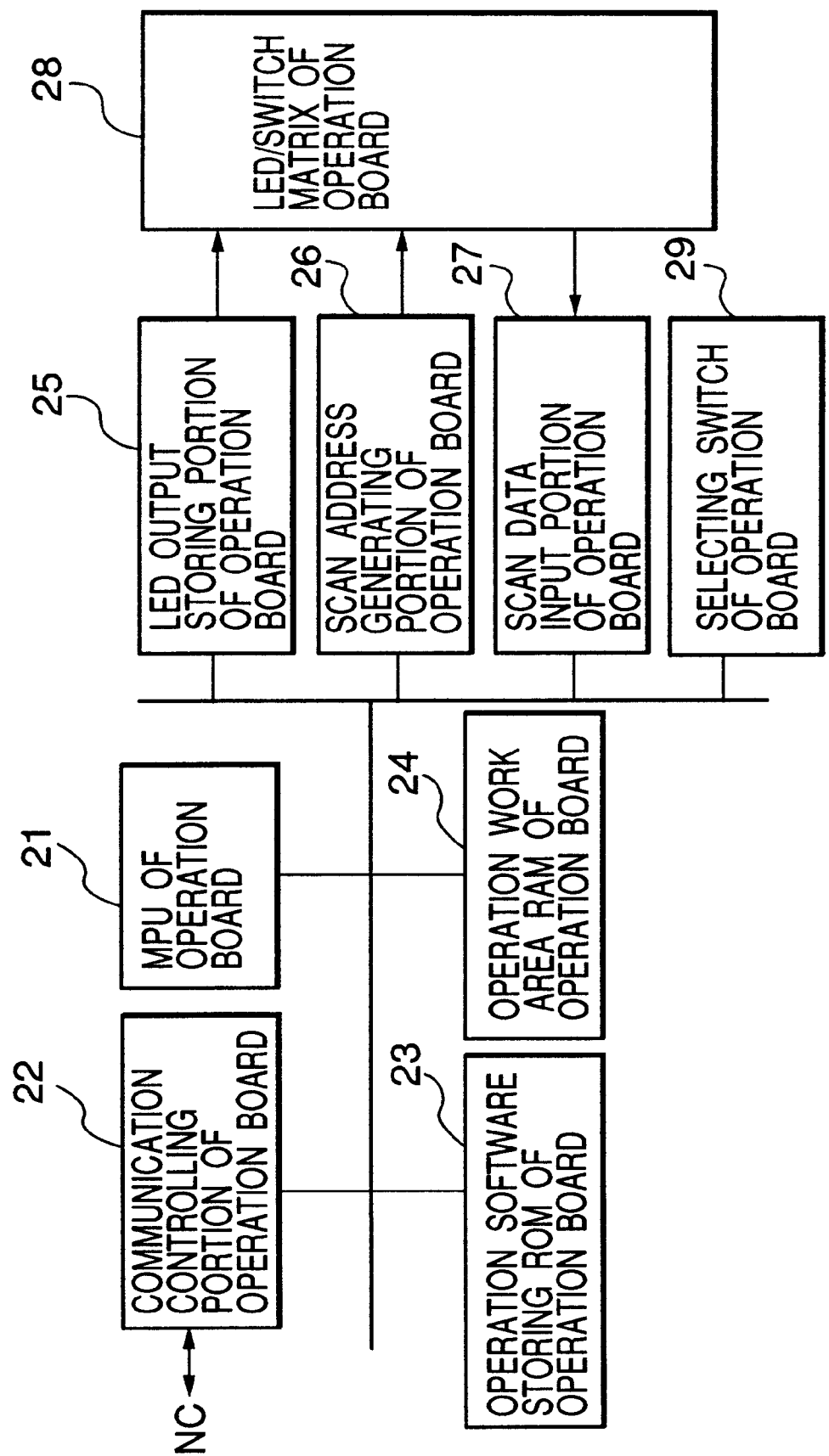
FIG. 17 is a block diagram showing an outlined structure of a conventional operation board.

FIG. 2 is a block diagram showing an outlined structure of the operation board 3 used in the operation board—remote I/O communication controlling system according to the present invention. As shown in FIG. 2, communication controlling portion 210 communicates with the NC unit 1. Operation board removing switch 211 is used when the operation board 3 is removed from the NC unit 1. Operation board mode selecting switch 212 is used when the mode of the operation board 3 is changed. In FIG. 2, similar portions to those in FIG. 17 are denoted by similar reference numerals.

As shown in FIG. 2, the communication controlling portion 210 operates without the need to use an MPU. Thus, unlike the conventional system shown in FIG. 17, the communication controlling portion 210 does not have or need an MPU or the associated ROM, RAM, etc.

Figure 3:
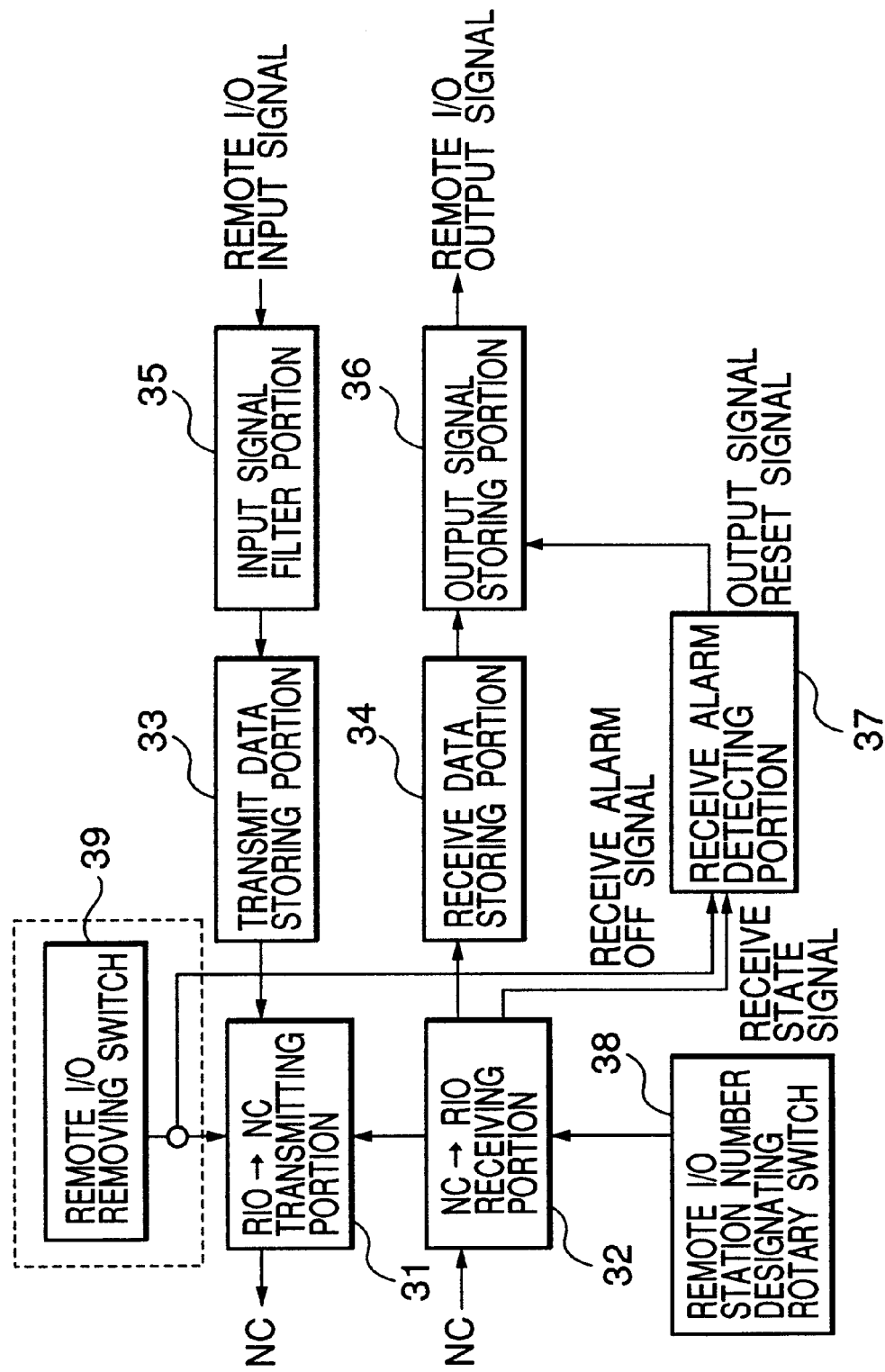
FIG. 3 is a block diagram showing an outlined structure of the remote I/O.
Figure 18:
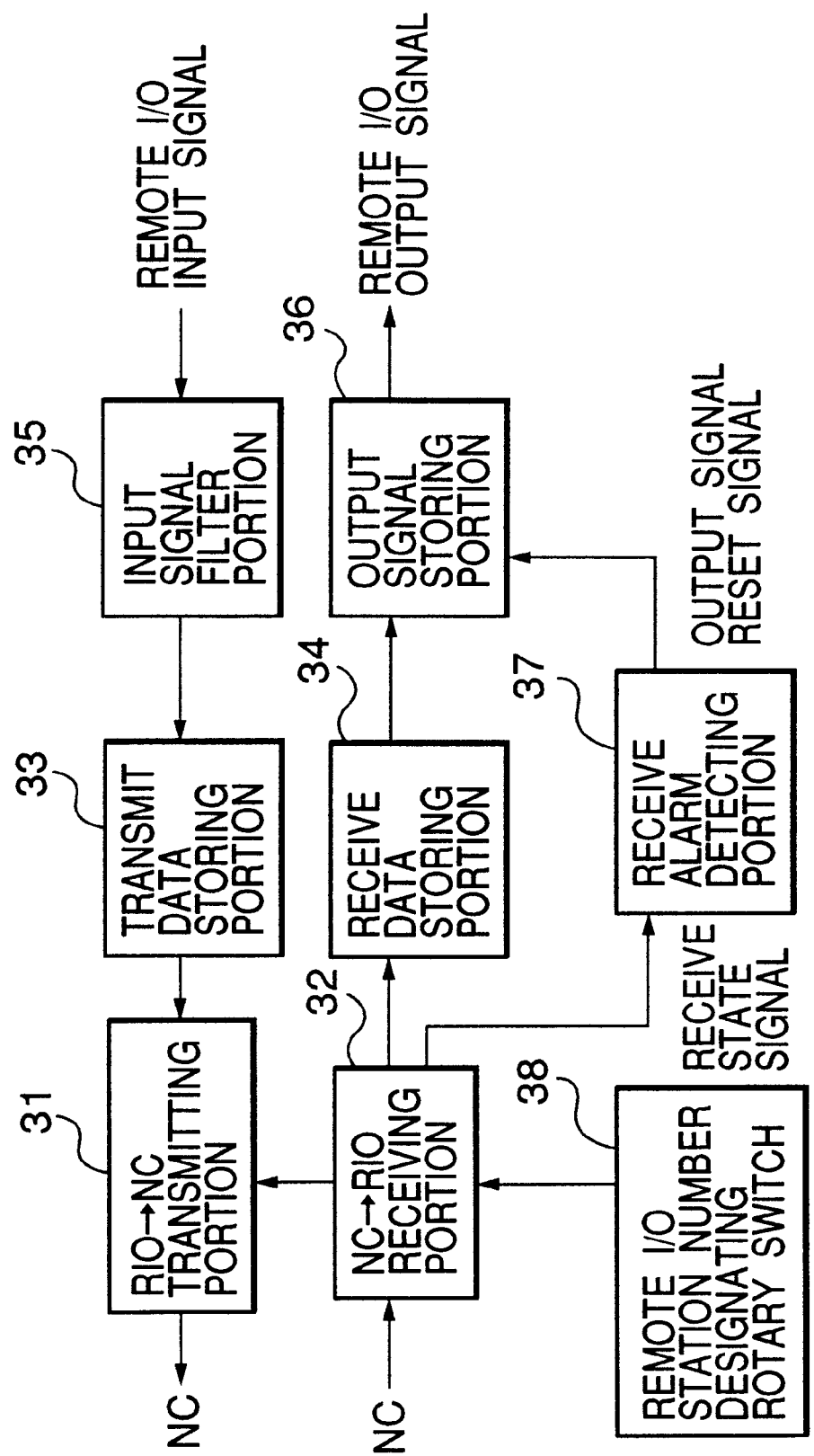
FIG. 18 is a block diagram showing an outlined structure of a conventional remote I/O.

FIG. 3 is a block diagram showing an outlined structure of the remote I/O 2. In FIG. 3, remote I/O removing switch 39 is used when the remote I/O 2 is removed from the NC unit 1. In FIG. 3, similar portions to those in FIG. 18 are denoted by similar reference numerals.

When the switch 39 is operated by the operator, a signal is input from the switch 39 to a transmitting portion 31 of the remote I/O. An identification code (also referred to as a header pattern) of a transmit frame that is transmitted from the remote I/O 2 to the NC unit 1 is switched and thereby the NC unit 1 determines that the remote I/O 2 has been removed. When the switch 39 is operated, a receive alarm OFF signal is transmitted to a receive alarm detecting portion 37. Thus, even if a signal received from the NC unit 1 is stopped, the receive alarm detecting portion 37 prevents an output signal storing portion 36 from being reset. The operation of the receive alarm OFF signal is required as a function for storing data in the case that data transmitted from the NC unit 1 to the remote I/O is stopped.

Figure 4:
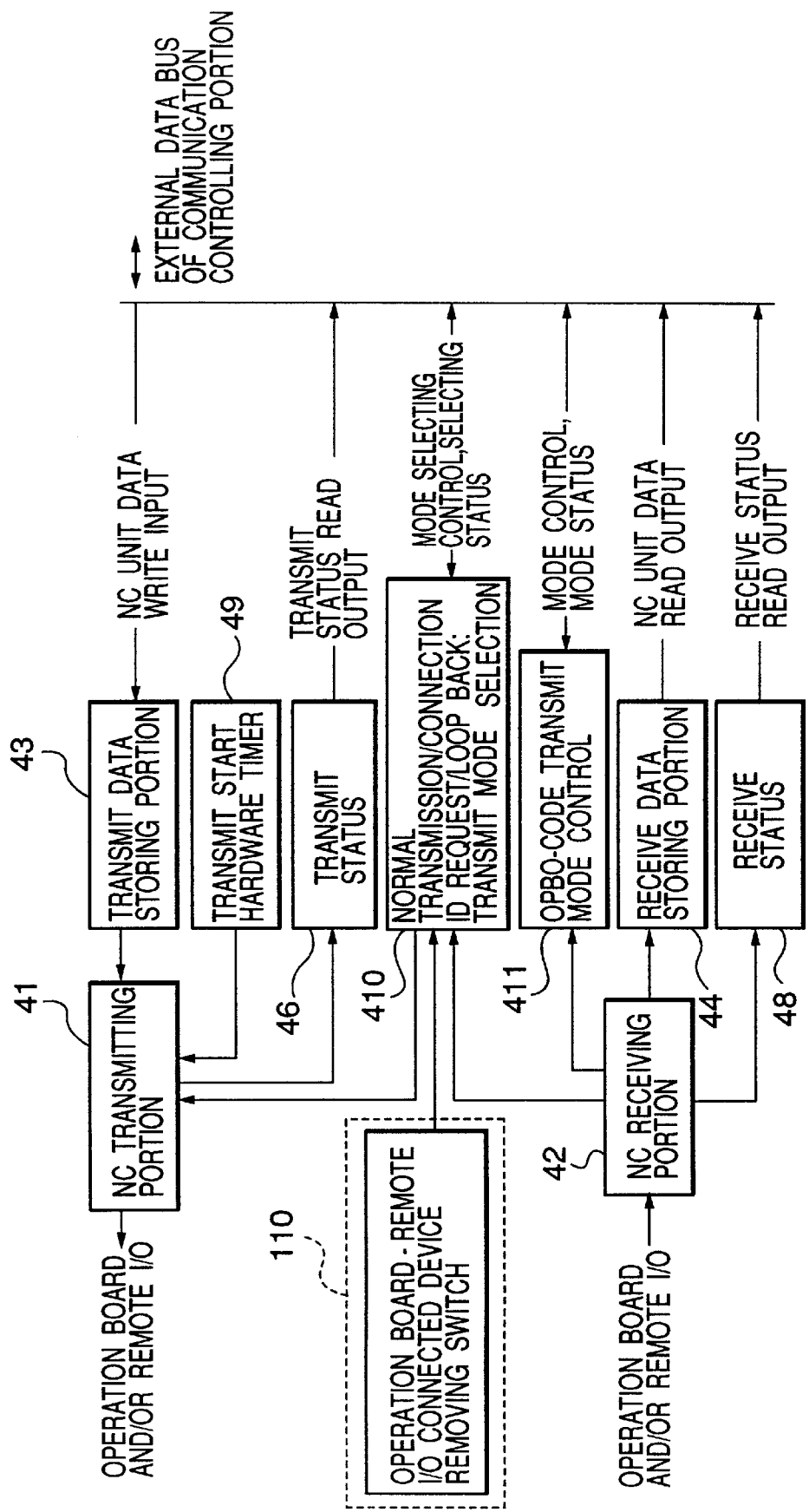
FIG. 4 is a block diagram showing an outlined structure of a communication controlling portion for the operation board on the NC unit side for use with the operation board—remote I/O communication controlling system according to the present invention.

FIG. 4 is a block diagram showing an outlined structure of the communication controlling portion for the operation board. The communication controlling portion is disposed in the NC unit 1 and is used in the operation board—remote I/O communication controlling system according to the present invention.

Figure 19:
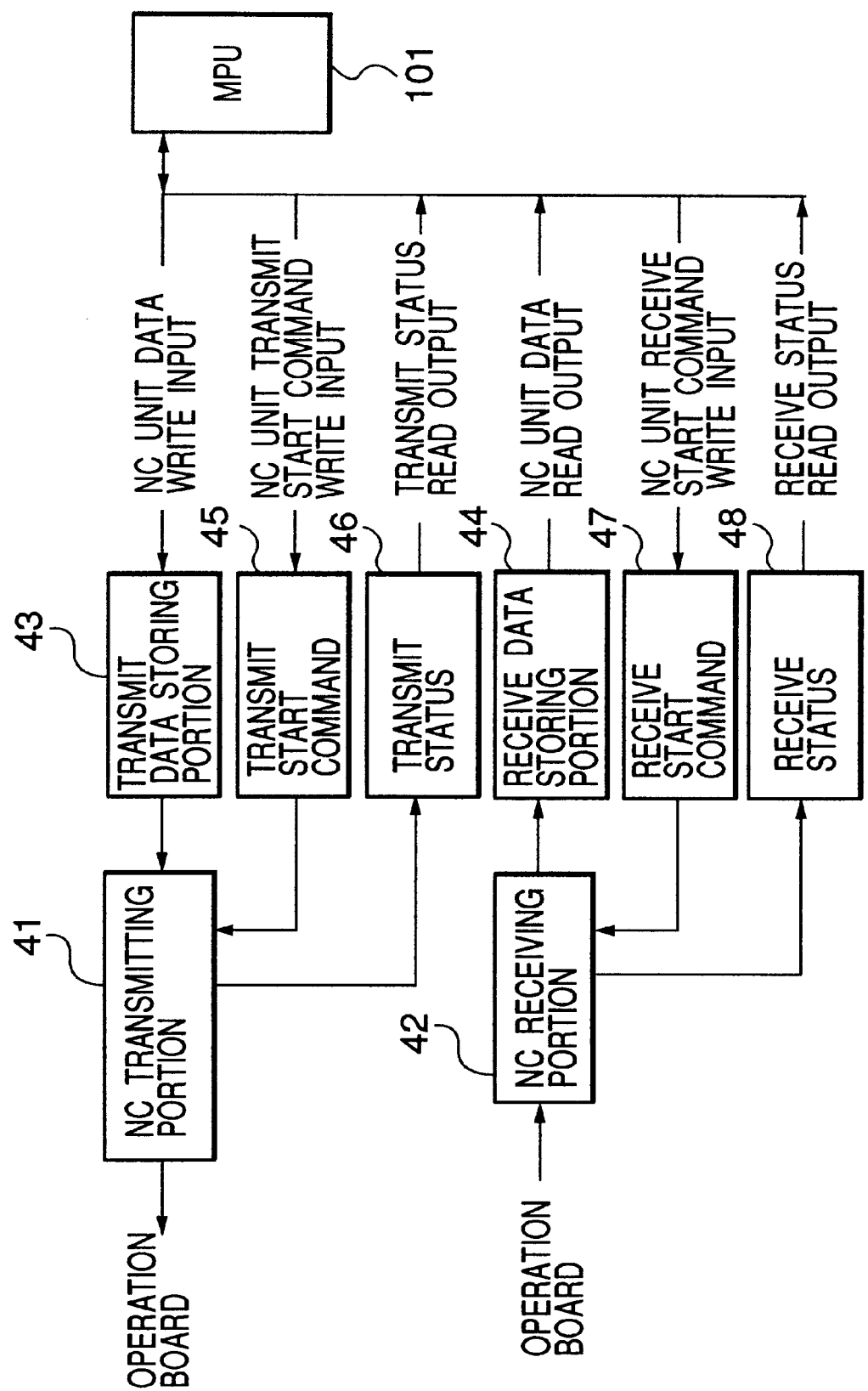
FIG. 19 is a schematic diagram showing an outlined structure of a conventional operation board communication controlling portion of an NC unit.

In FIG. 4, transmit start hardware timer 49 has the same function as that of the remote I/O of the communication controlling portion of the NC unit 1 of the related art reference. (See FIG. 19). Reference numeral 410 is a transmit mode selecting control/selecting status control portion. Code transmit controlling portion 411 controls the transmission and reception of the code conversion table for the operation board 3.

The operations for the communications of the communication controlling portions of the NC unit 1, the operation board 3, and the remote I/O 2 accord with the conventional HDLC protocol. In the communication controls between the NC unit 1 and the operation board 3 and between the NC unit 1 and the remote I/O 2 in the embodiment, the high speed communication controlling system with short transmit/receive frames exchanged between the NC unit 1 and the remote I/O 2 is used. The communications between the NC unit 1 and the operation board 3 are performed corresponding to the high speed communication controlling system with short transmit/receive frames. The communication controlling portion (also referred to as a serial communication I/F) of the NC unit 1 is selectively connected to the operation board 3 or the remote I/O 2.

Figure 5:
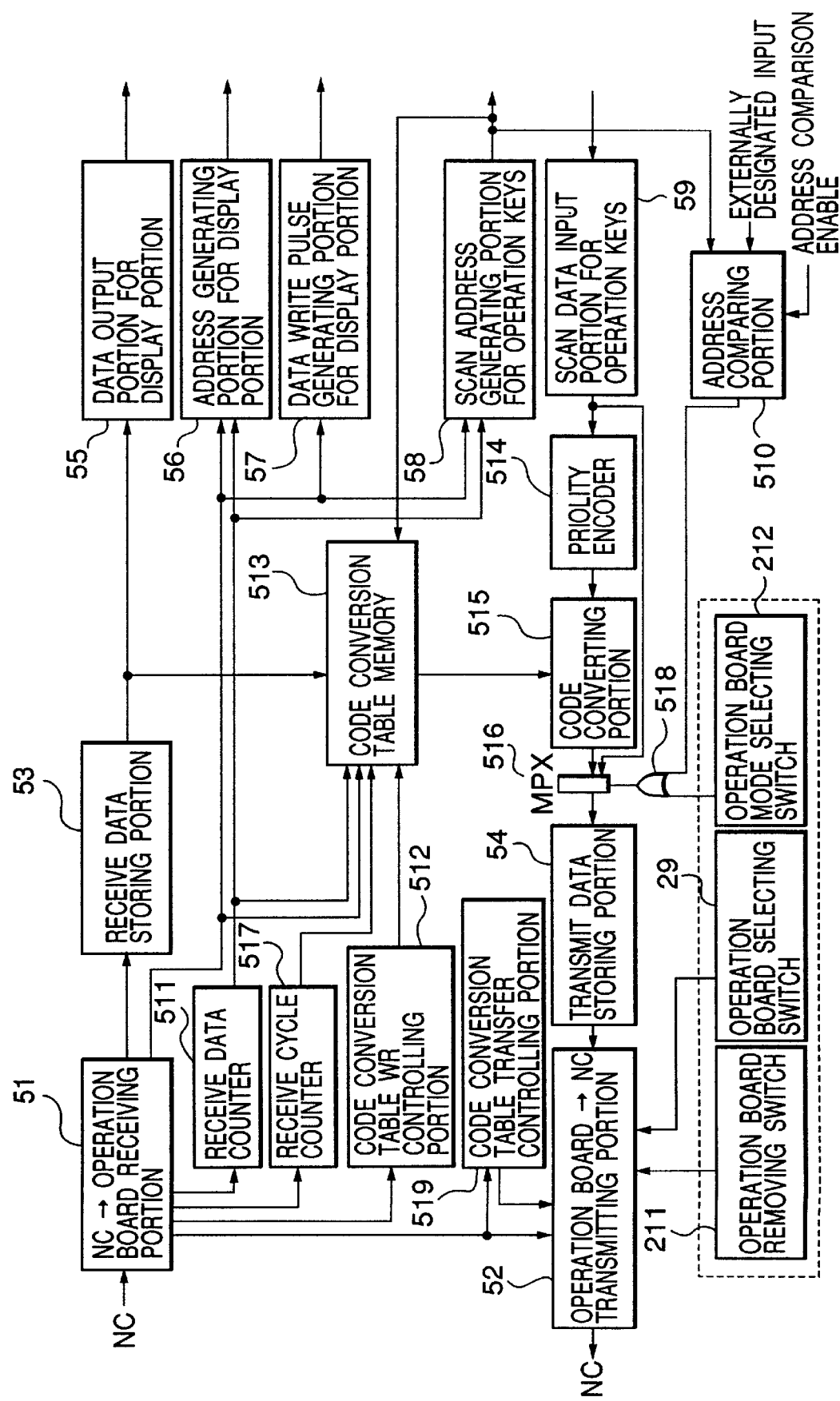
FIG. 5 is a block diagram showing a detailed internal structure of the communication controlling portion for the operation board shown in FIG. 2.

FIG. 5 is a block diagram showing an internal structure of the communication controlling portion 210 of the operation board 3 shown in FIG. 2. In FIG. 5, receiving portion 51 receives a signal from the NC unit 1 to the operation board 3, and transmitting portion 52 transmits a signal from the operation board 3 to the NC unit 1. Receive data storing portion 53 stores receive data received by the receiving portion 51. Transmit data storing portion 54 stores transmit data transmitted from the transmitting portion 52. The data output portion 55 outputs the receive data stored in the receive data storing portion 53 to a display portion such as LEDs. The address generating portion 56 outputs an address to the outside of the communication controlling portion 210 so as to cause the operation board LED output storing portion to keep the output to the LEDs.

The data write pulse generating portion 57 generates a data write pulse in synchronization with the LED output data of the data output portion 55 of the display portion. The scan address generating portion 58 generates a scan address of the operation key 107 of the operation board 3. The scan data input portion 59 inputs data corresponding to a scan address generated by the scan address generating portion 58.

Address comparator 510 compares the signal state of the scan address generated by the scan address generating portion 58 with externally designated input data that has been set outside the communication controlling portion. Receive data counter 511 counts the number of data bytes of the receive frame received from the NC unit 1 to the receiving portion 51. Code conversion table WR controlling portion 512 outputs a signal for controlling the write operation of the code conversion table memory 513 corresponding to a signal received from the receiving portion 51. Code conversion table memory 513 stores a code conversion table for converting data that is input by the operation keys 107, scanned, and input to the scan data input portion 59.

Priority encoder 514 selects an operation key with the highest priority from a plurality of operation keys 107 when they are scanned. Code converting portion 515 that reads operation key code data from the code conversion table memory 513 corresponding to the output data of the priority encoder 514 and stores the obtained operation key code data. Multiplexer MPX 516 selects data stored in the code converting portion 515 or data that is input to the scan data input portion 59. Receive cycle counter 517 outputs a write address of the code conversion table data of the operation keys 107 transmitted from the NC unit 1 in a plurality of sessions. OR gate 518 inputs a signal from the address comparator 510 and a signal from the operation board mode selecting switch 212 and outputs the selected signal to the multiplexer 516. Reference numeral 519 is a code conversion table transfer controlling portion.

Figure 6:
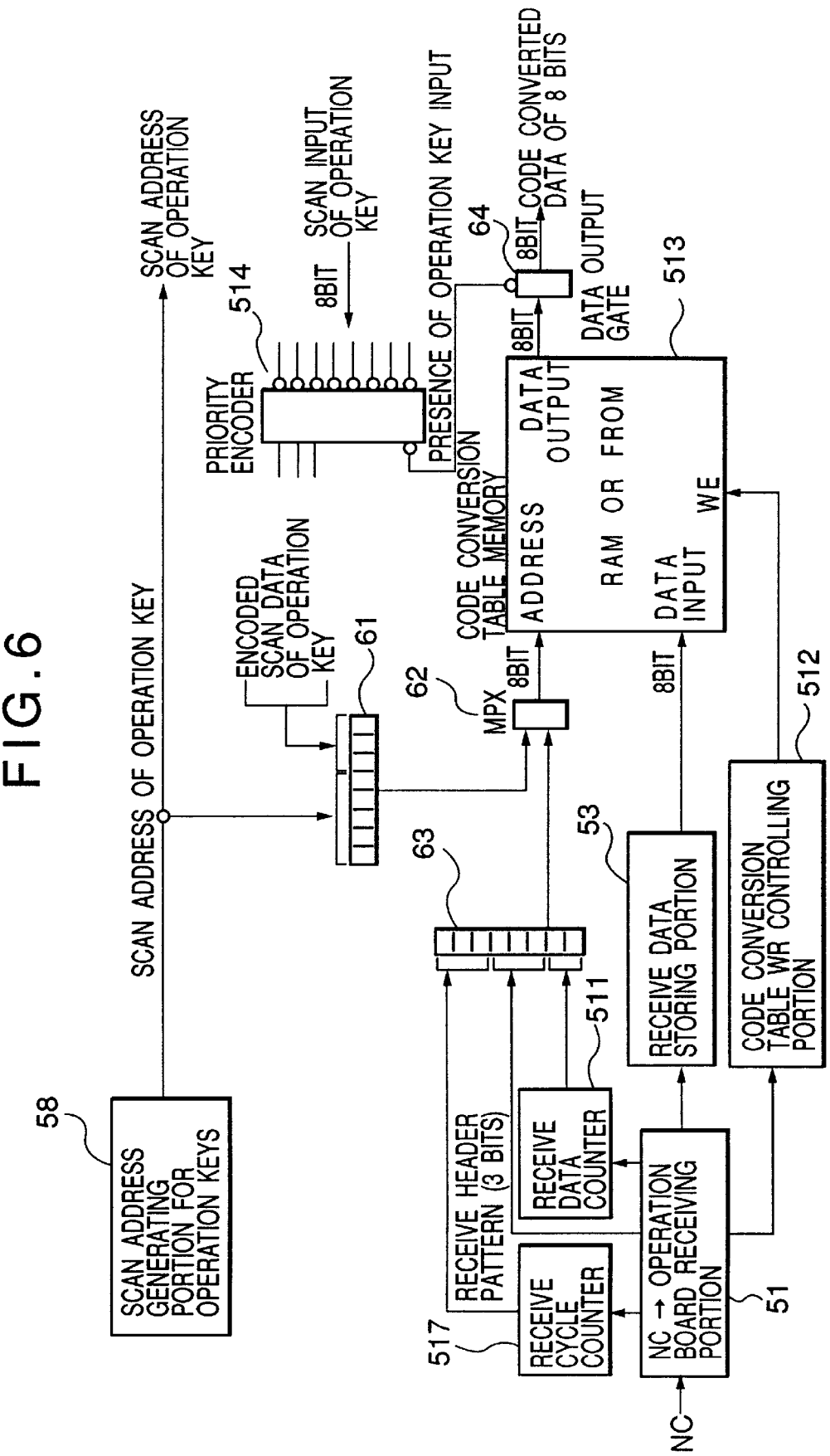
FIG. 6 is a schematic diagram for explaining the operation of a code converting portion that composes the communication controlling portion for the operation board shown in FIG. 2.

FIG. 6 is a schematic diagram for explaining the operation of the code converting portion 515 (of the operation board) that composes the communication controlling portion 210

(of the operation board) shown in FIG. 5. In FIG. 6, similar portions to those in FIG. 5 are denoted by similar reference numerals.

In FIG. 6, address signal 61 is input to the code conversion table memory 513 when the operation board 3 normally operates. The address signal is composed of a scan address of an operation key and scan data of which the operation key has been encoded. Multiplexer 62 changes an address depending on whether the normal operation is performed or a code conversion table is written to the operation board 3. Address signal 63 designates an address of which a code conversion table is written to the code conversion table memory 513 of the operation board 3. Each of the address signal 61 and the address signal 63 is composed of eight bits. Data output gate 64 is equivalent to the code converting portion 515 shown in FIG. 5. The data output gate 64 stores data read from the code conversion table memory 513 and clears the stored data corresponding to an input presence/absence signal received from the operation keys 107.

Next, with reference to FIGS. 5 and 6, the real operation of the communication controlling portion 210 of the operation board 3 will be described.

When the system is started in the state that the NC unit 1 and the operation board 3 have been connected, the NC unit 1 transmits a connection ID request transmit frame to the operation board 3. The connection ID request transmit frame requests the operation board 3 to reply with the type of the operation board that is connected to the NC unit 1. The transmit frame is received by the receiving portion 51. The receiving portion 51 transfers the header pattern of the connection ID request transmit frame as an identification signal to the transmitting portion 52. The transmitting portion 52 transmits ID information or the like that represents the type of the operation board 3 selected by the operation board selecting switch 29 to the NC unit 1. Thus, the NC unit 1 receives the connection ID information frame of the operation board 3 transmitted from the transmitting portion 52, determines the type of the operation board 3, stores relevant code conversion table data to the transmit data storing portion 43 of the communication controlling portion 109 of the NC unit 1, and changes the current mode to the code conversion table data transmit mode.

When the NC unit 1 is switched to the transmit mode of the code conversion table data, the communication controlling portion 109 of the NC unit 1 transmits a frame containing a header pattern that represents the code conversion table transmit mode to the operation board 3. The code conversion table data contained in the receive frame received by the receiving portion 51 of the operation board 3 is written to the code conversion table memory 513.

When the operation key data that is input from the operation key 10 of the operation board 3 is converted, as represented by address signal 61 of FIG. 6, an operation key scan address (5 bits) and encoded operation key scan data (3 bits) received from the priority encoder 514 should be read as an address input data of the code conversion table memory. In other words, code data corresponding to the 8-bit scan input data of the operation keys 107 should be prepared. Thus, areas for the 8-bit address signal and the 256-byte code conversion table memory 513 are required.

When the code conversion table data is transferred from the NC unit 1 to the operation board 3, the 8-bit address of the address signal 63 should be input to the code conversion table memory 513. The 8-bit address signal is composed of the output data (two least significant bits) of the receive data counter 511, three bits of the header pattern of the receive frame, and the output data (three most significant bits) of the receive cycle counter 517.

The receive data counter 511 is a counter that counts data of 4 bytes of the transmit frame transmitted from the NC unit 1. The output data of the receive data counter 511 is the least significant bit that defines the address of each code conversion table data transmitted from the NC unit 1. The header pattern of a receive frame accords with a header pattern of a frame transmitted from the NC unit 1, the header pattern varying from 000 to 111. The receive cycle counter cyclically counts receive cycles from 000 to 111. One cycle of frames received from the NC unit 1 contains code conversion table data for 32 bytes. Thus, the receive cycle counter 517 generates the highest order address (000 to 111) for 8 cycles.

The multiplexer 62 selects an address of the address signal 61 of the code conversion of the operation key data that is input from the operation keys 107 of the operation board or an address of the code conversion table data. The multiplexer 62 selects one of the two types of addresses corresponding to the output signal of the receiving portion 51. The code conversion table memory 513 inputs the address signal received from the multiplexer 62, the data received from the receive data storing portion 53, and the write signal received from the code conversion table WR controlling portion 513. These signals are controlled corresponding to the output signal of the receiving portion 51. The address signal transmitted from the multiplexer 62 and the code conversion table data transmitted from the NC unit 1 are written to relevant addresses.

In the case that the code conversion table data has been transferred and the mode of the NC unit 1 has been switched from the code conversion table data transmit mode to the normal signal transmit mode, when the NC unit 1 transmits a transmit frame that represents the normal mode to the receiving portion 51. The receive data storing portion 53 of the receiving portion 51 stores the received data and inputs the data to the data output portion 55 for the display portion. The address generating portion 56 for the display portion, the data write pulse generating portion 57 for the display portion, and the scan address generating portion 58 for the operation keys generate the address signal for the LED output storing portion 25 for the operation boards (see FIG. 2) and the communication controlling portion 210 of the operation board 3, the output data write signal for the LED output storing portion 25 for the operation board, and the scan address signal for the switch matrix (see FIG. 2) of the operation board corresponding to the control signal received from the receiving portion 51.

When the scan address signal received from the scan address generating portion 58 for the operation keys is transferred to the switch matrix 28 of the operation boards, the operation key scan data corresponding to the scanned result is input to the scan data input portion 59 for the operation keys. Thereafter, the scanned data is transmitted to the transmit data storing portion 54 through the priority encoder 514, the code converting portion 515, and the multiplexer 516. Alternatively, the scanned data is transmitted from the operation key scan data input portion 59 to the transmit data storing portion 54 through the multiplexer 516.

The multiplexer 516 is a selector similar to the multiplexer 62 shown in FIG. 6. The multiplexer 516 selects an input corresponding to an output signal of the operation board mode selecting switch 212 or an output signal of the address comparator 510. The address comparator 510 compares the externally designated input data of the communication controlling portion 210 and the address value of the scan address generating portion 58 for the operation keys. When the externally designated input data is larger or smaller than the address value of the scan address generating portion 58 for the operation keys, the address comparator 510 outputs a signal to the OR gate 518. This function accords with the case that the operation key with a large scan address is directly transmitted to the NC unit 1 (not converted) or with the case that the operation key with a small scan address is directly transmitted to the NC unit 1 (not converted).

The operation board mode selecting switch 212 is a switch that selects the mode of all regions (rather than a region for each scan address) unlike with the address comparator 510. The priority encoder 514 is a conventional priority encoder that is used as a standard logic IC. The priority encoder 514 encodes the highest priority signal of the input signal of 8 bits and outputs a signal of 3 bits. In addition, the priority encoder 514 outputs to the data output gate 64 a signal for determining whether or not the scan input data for the operation keys is present. When all scan input data for the operation keys (namely, the input data of 8 bits) is not present, the data output gate 64 sets a code that represents for example no signal and transmits the code to the NC unit 1. Thus, the MPU 101 of the NC unit 1 detects that there is no operation key input data.

In the case that the operator has finished the operation of the operation board 3 and placed the NC unit 1 in the automatic operation mode, since the NC operates, it is not necessary for the operator to operate the operation board 3.

In this case, the operator performs a removing operation of the operation board 3. First, the operator operates the operation board removing switch 211 shown in FIG. 5 or the operation board—remote I/O connected device removing switch 110. Thus, the transmitting portion 52 transmits a transmit frame having a header pattern that represents that the transmitting portion 52 has issued an operation board removing request to the NC unit 1. Alternatively, a signal that represents that an operation board removing request has been issued is input to the NC unit 1. Thus, the NC unit 1 returns to a connection ID request communication mode that is the initial mode.

Thus, the operation board 3 is removed from the NC unit 1. The removed operation board can be connected to another NC unit. Consequently, one operation board can be effectively used in common with a plurality of NC units.

At this point, when the NC unit 1 transmits a relevant signal to the MPU 101 and it causes the display device 108 of the operation board 3 to display that the operation board 3 is in a removable state (or the MPU 101 causes an LED of the NC unit 1 to display the similar state), the operator can confirm that whether or not the MPU 101 of the NC unit 1 has correctly received the operation board removing request.

Next, the operation of the operation board—remote I/O communication controlling system according to the embodiment shown in FIGS. 1 to 6 will be described, especially for the operation of the operation board.

Figure 7:
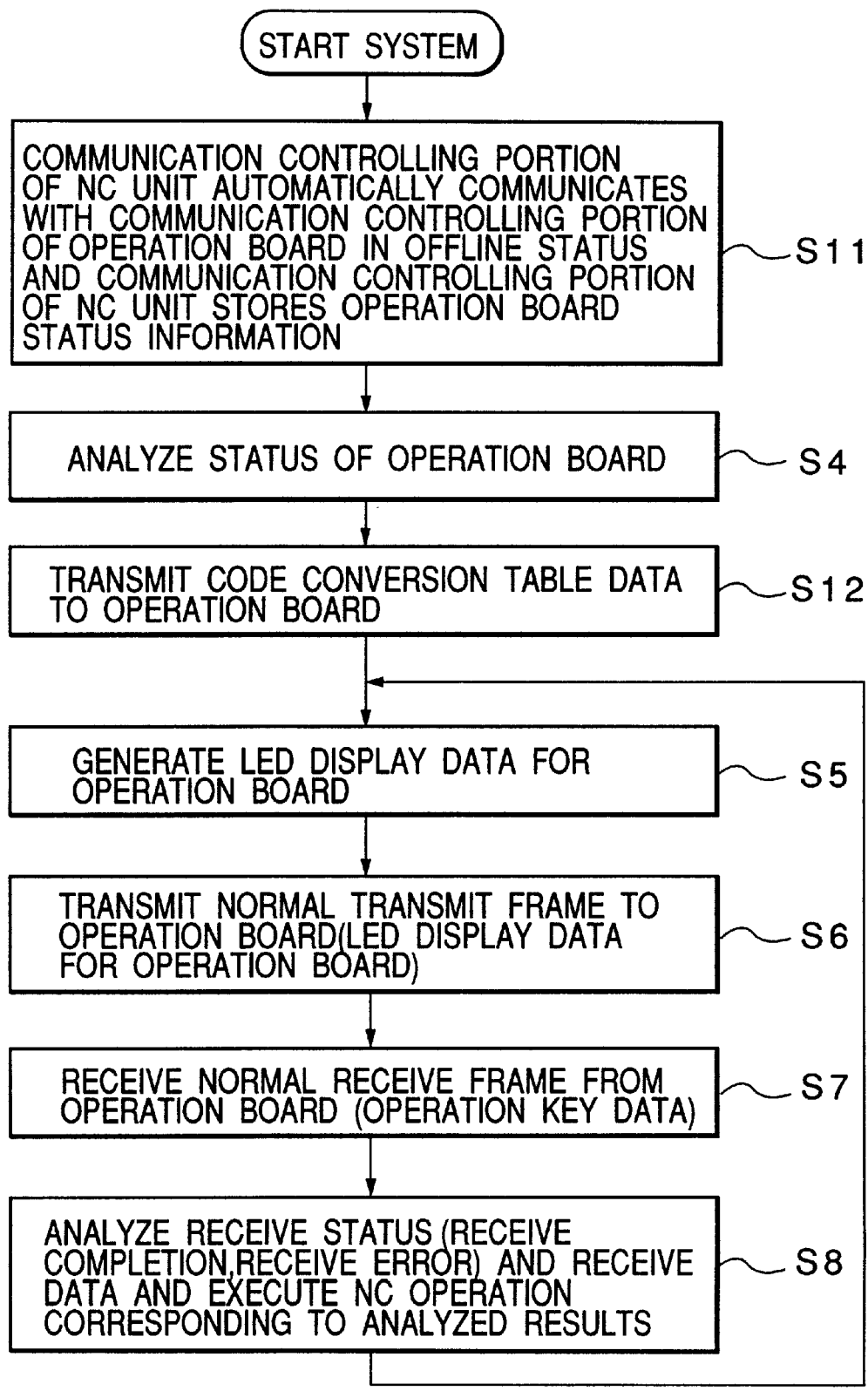
FIG. 7 is a flow chart showing an operational flow of a program software process of the NC unit according to an embodiment of the present invention.

FIG. 7 shows an operational flow of a program software process of the MPU 101 of the NC unit 1 according to the embodiment. The operational flow shown in FIG. 7 corresponds to that shown in FIG. 20.

Figure 8:
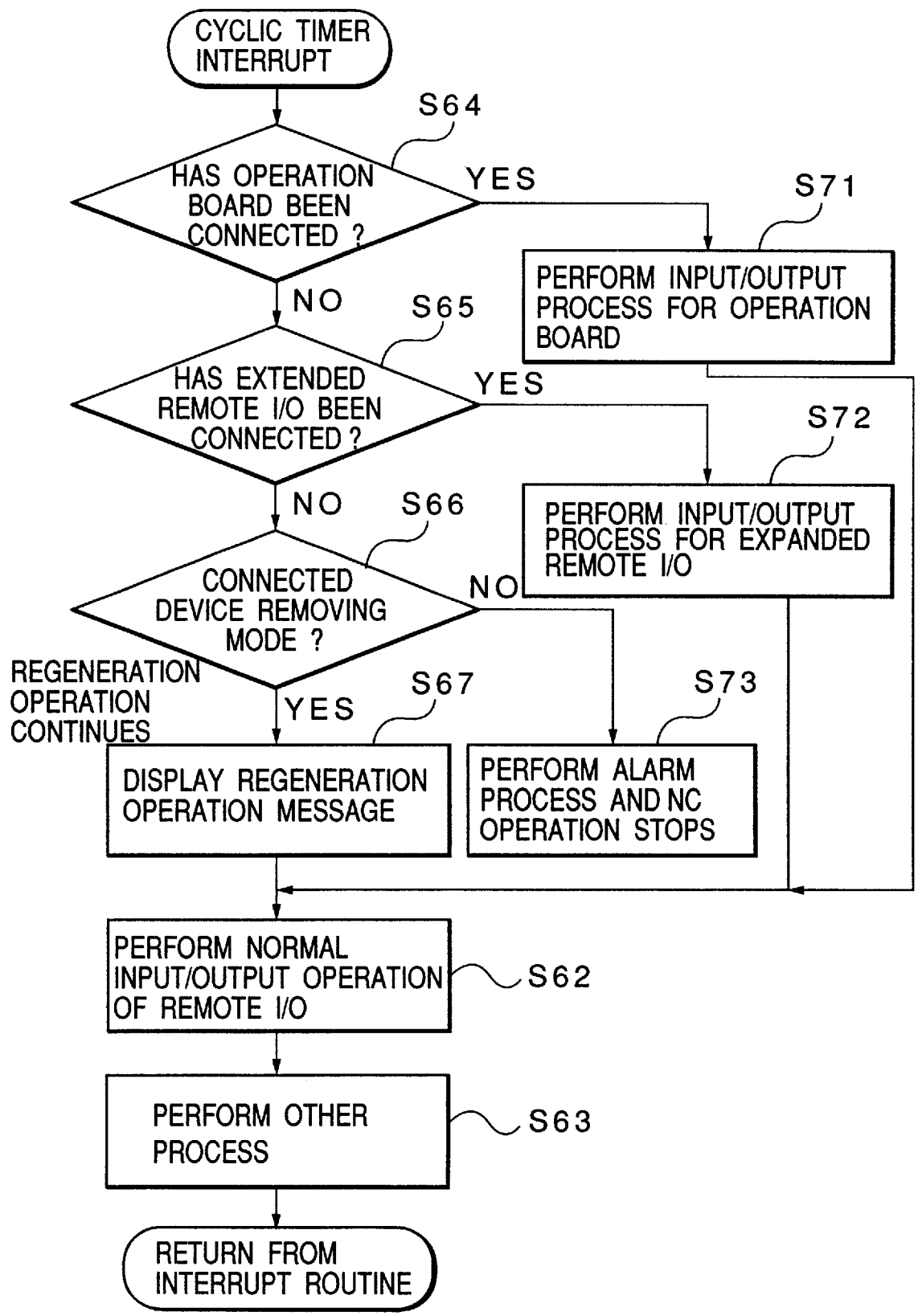
FIG. 8 is a flow chart showing an operational flow of a program software process of an MPU of the NC unit for inputs/outputs with the operation board and the remote I/O according to the embodiment.

FIG. 8 shows an operational flow of a program software process of the MPU 101 of the NC unit 1 for inputs/outputs with the operation board 3 and the remote I/O 2. The operational flow shown in FIG. 8 corresponds to that shown in FIG. 21. In FIG. 8, steps S5, S6, S7, and S8 of FIG. 7 are explained along with the process of the remote I/O.

Figure 20:
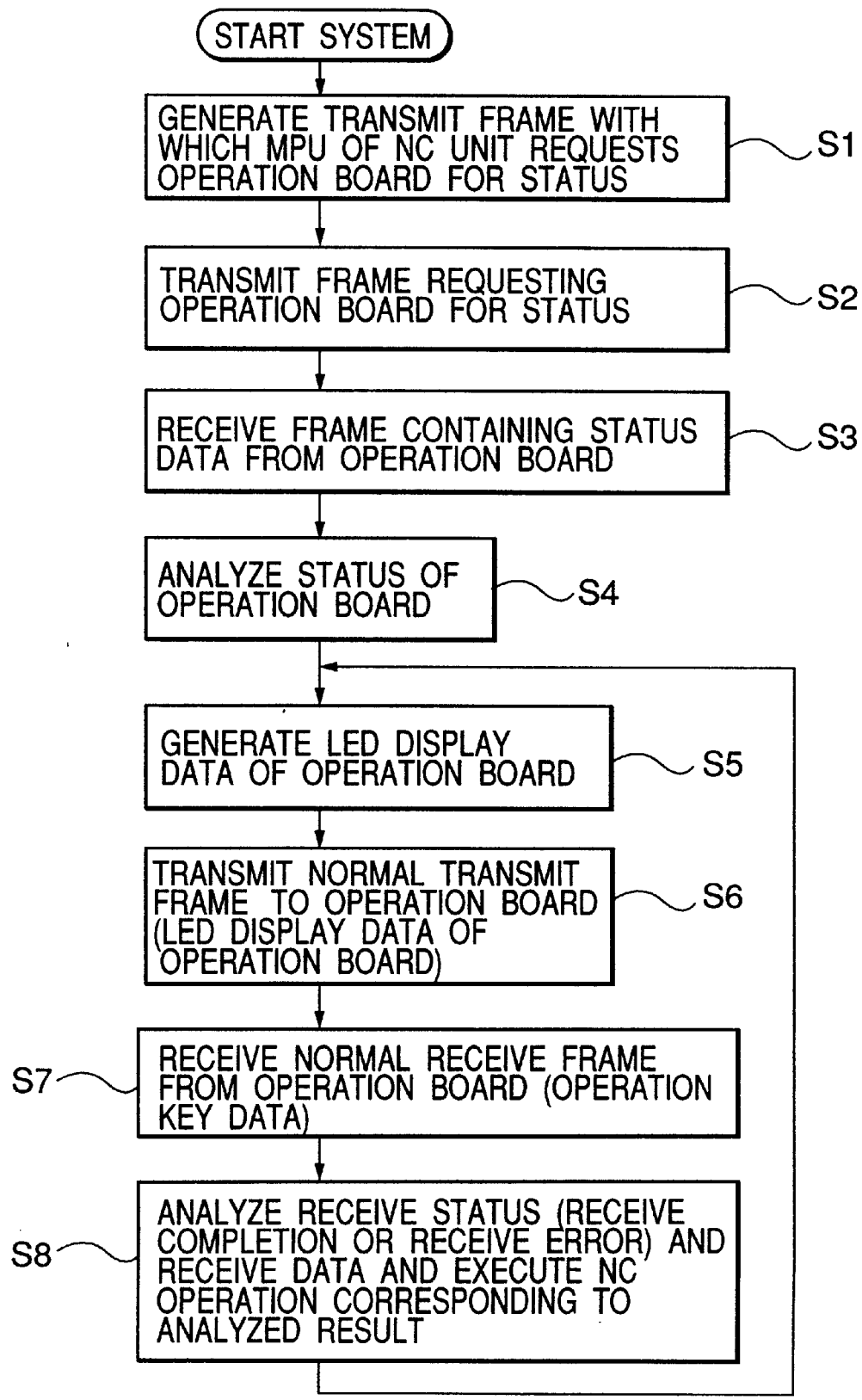
FIG. 20 is a flow chart showing an operational flow of a program software process of an MPU of the conventional NC unit.

In the conventional system shown in FIG. 20, the MPU 101 of the NC unit 1 transmits to the operation board 3 a transmit frame containing a status request of the MPU 101 of the NC unit 1 against the operation board 3. The NC unit 1 receives from the operation board 3 a frame containing a status that represents the type of the operation board 3 (at steps S1, S2, and S3).

On the other hand, in the embodiment shown in FIG. 7, as with the remote I/O 2, the communication controlling portion 109 of the NC unit 1 and the communication controlling portion 210 of the operation board 3 automatically issue a status request and transmit status information of the operation board to the NC unit 1 without an intervention of the MPU 101 of the NC unit 1. The communication controlling portion 109 of the NC unit 1 reads receive data stored in the receive data storing portion 44 and analyzes it (at step S4).

In the conventional system, the operation board 3 has the MPU 21 and the ROM 23 including the code conversion table corresponding to the operation board. In other words, the operation board 3 has code conversion table data. However, in this embodiment, since such a structure is not used, a data transmitting process (at step S12) for transmitting the code conversion table from the NC unit 1 to the operation board 3 is required.

According to the embodiment, the NC unit 1 has the code conversion table data and transmits it to the operation board 3. This is because the system software of the NC unit 1 is dedicated for a machine tool. Thus, the system software depends on the machine tool for use. In addition, the operation board 3 depends on the machine tool. Consequently, the code conversion table data of the operation board 3 is stored in the ROM 102 that stores the system software of the NC unit 1 so as to totally control data.

In both the conventional system shown in FIG. 20 and the system according to the embodiment shown in FIG. 7, the process of steps S5 to S8 is performed corresponding to a cyclic timer interrupt. The similar process is performed for the remote I/O 2 upon a timer interrupt. Next, with reference to FIG. 8, the cyclic timer interrupt operation will be described.

Figure 21:
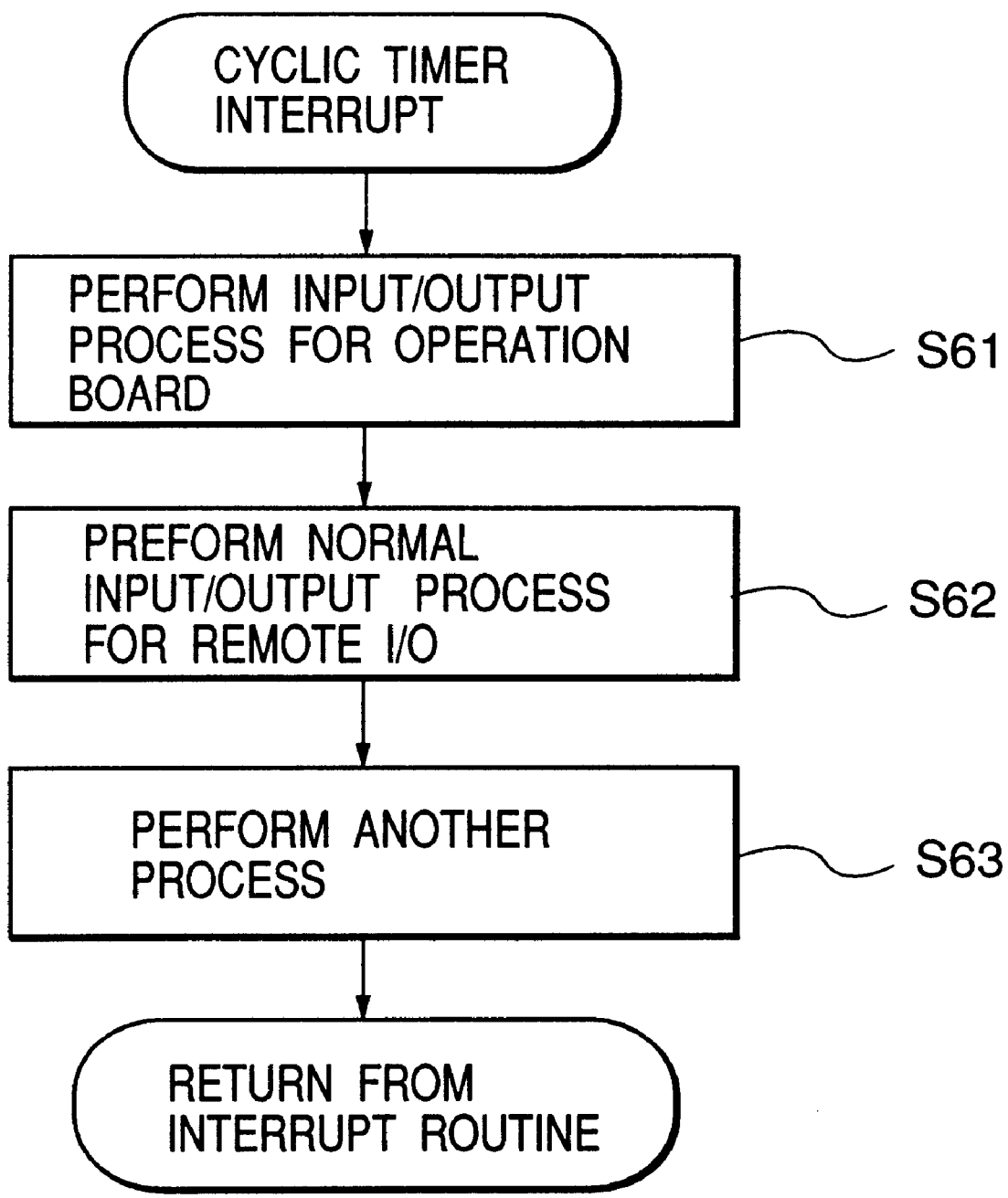
FIG. 21 is a flow chart showing an operational flow of a program software process of the MPU of the conventional NC unit for inputs/outputs with an operation board and a remote I/O.
Figure 22:
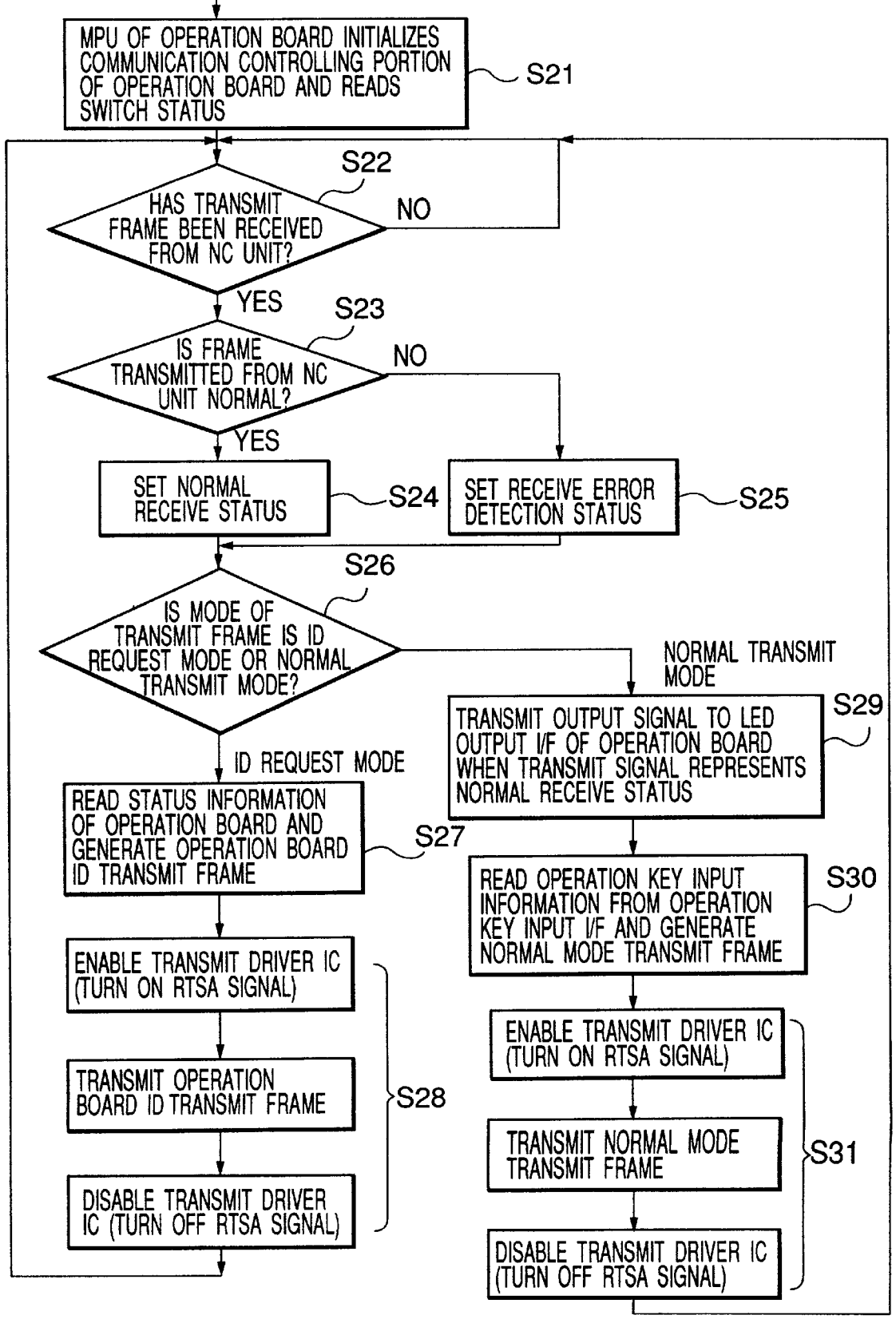
FIG. 22 is a flow chart showing an operational flow of a program software process the MPU in the conventional operation board.

In the conventional system that performs the operational flow shown in FIG. 21, the operation board 3 and the remote I/O 2 are connected to the NC unit 1 with dedicated serial communication I/Fs (namely, dedicated communication controlling portions and transmit/receive signal lines). Thus, the operation board 3 and the remote I/O are separately processed.

On the other hand, in the system that performs the operation according to the embodiment shown in FIG. 8, when a timer interrupt takes place, it is determined whether or not the operation board 3 has been connected (namely, the operation board connecting state) (at step S64). When the operation board 3 has not been connected, it is determined whether or not an extended remote I/O has been connected (at step S65). When the operation board 3 has been connected, an operation board input/output process is performed (at step S71). When an extended remote I/O has been connected, an input/output process for the extended remote I/O is performed (at step S72).

When neither the operation board 3 nor the remote I/O 2 has been connected, it is determined whether or not the current mode is a connected device removing mode (at step S66). When the current mode is not the connected device removing mode, an alarm process is performed and the operation of the NC is stopped (at step S73). When the current mode is the removing mode, a message that represents that a regeneration operation takes place is displayed (at step S67). In addition, the normal input/output process for the remote I/O process (at step S62) and another process (at step S63) are performed. Thus, the flow exits from the interrupt process routine.

Figure 9:
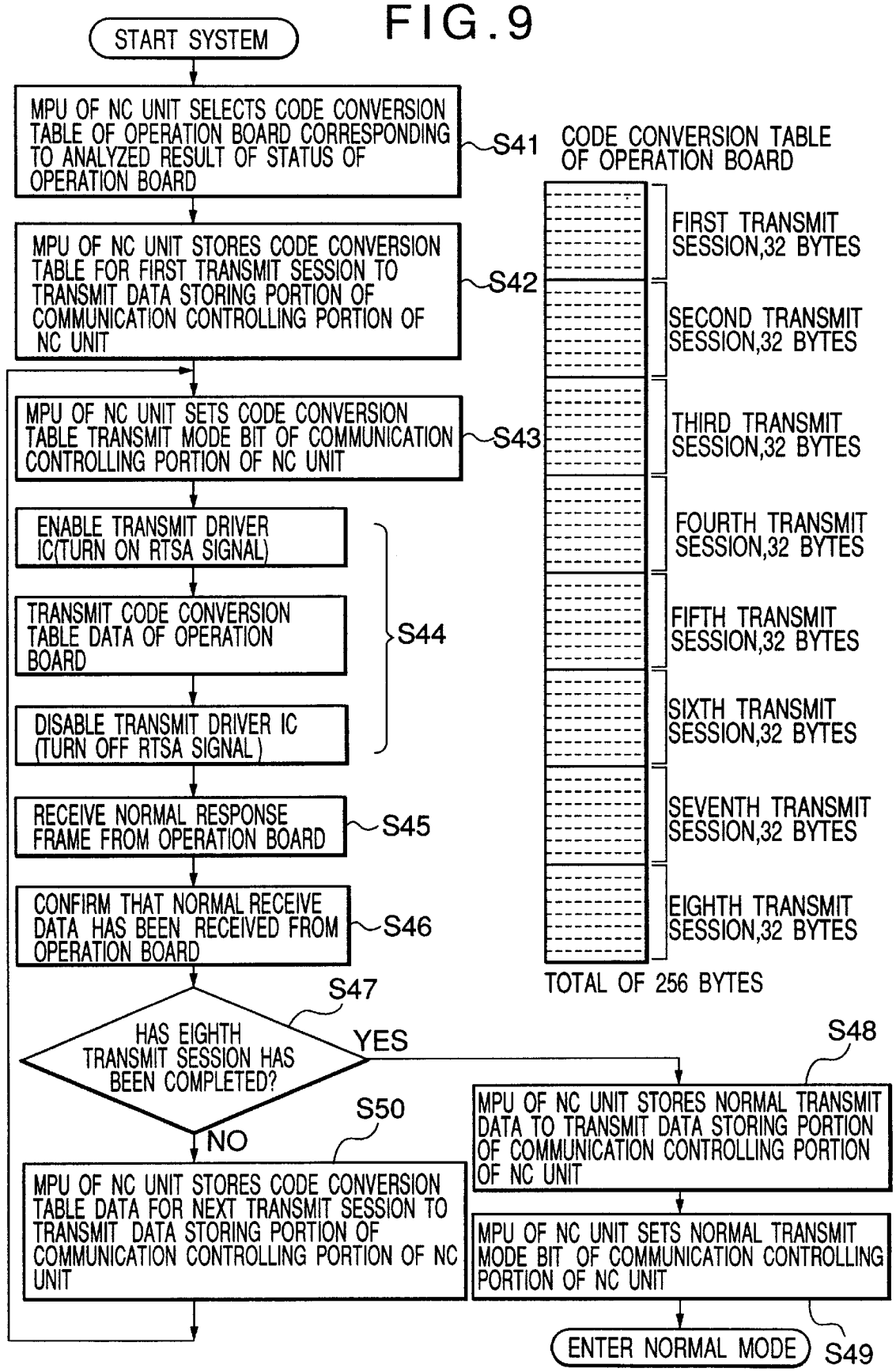
FIG. 9 is a flow chart showing a transmitting process for transmitting code conversion table data from the NC unit to the operation board according to the embodiment of the present invention.

FIG. 9 is a flow chart showing a transmitting process of code conversion table data transmitted from the NC unit 1 to the operation board 3. This flow chart shows the process of step S12 of FIG. 7 in detail. Next, with reference to FIG. 9, the transmitting process of the code conversion table data will be described.

When the system of the NC unit 1 is started, the communication controlling portion 109 of the NC unit 1 enters a connection ID request mode. The communication controlling portion 109 transmits a transmit frame that represents a connection ID request mode to the operation board 3 connected to the NC unit 1 without an intervention of the MPU 101 of the NC unit 1. Thereafter, the communication controlling portion 109 receives a receive frame containing information that represents the type of the operation board (namely, a receive frame containing operation board ID information) from the operation board 3 that has received the transmit frame of the connection ID request mode.

The MPU 101 of the NC unit 1 determines whether or not the communication controlling portion 109 is in the connection ID request mode, analyzes the status of the operation board 3 (the status is transmitted from the operation board 3 and stored in the receive data storing portion 44), and selects a code conversion table for the operation board 3 corresponding to the analyzed result (at step S41).

Next, the MPU 101 of the NC unit 1 stores first transmit data with a predetermined transmit length of the code conversion table to the transmit data storing portion 43 (at step S42). The transmit length is for example 32 bytes. The entire length of the code conversion table is for example 256 bytes. Thus, the transmit data is transmitted in for example eight sessions.

Thereafter, the MPU 101 of the NC unit 1 causes the communication controlling portion 109 to enter the code conversion table transfer mode (at step S43). The communication controlling portion 109 enables the transmit driver IC so as to transmit the code conversion table data. Thus, the communication controlling portion 109 disables the transmit driver IC (at step S44). These operations are automatically performed by the communication controlling portion 109.

When the operation board 3 has correctly received the code conversion table data, the operation board 3 transmits a normal receive reply frame to the NC unit 1. The NC unit 1 receives this signal (at step S45).

When the MPU 101 of the NC unit 1 confirms that the first code conversion table data has been transmitted to the operation board 3 corresponding to the status of the communication controlling portion 109 (at step S46), the MPU 101 determines whether or not all 256 bytes of the code conversion table data have been transmitted (at step S47). When the code conversion table data has not been completely transmitted, the MPU 101 prepares the next data (at step S50). Thereafter, the flow returns to step S43.

When all 256 bytes of code conversion table data have been completely transmitted at step S47, the MPU 101 of the NC unit 1 stores the normal transmit data to the transmit data storing portion 43 (at step S48) and causes the communication controlling portion 109 to enter the normal transmit mode (at step S49).

In such a manner, the code conversion table data is transmitted from the NC unit 1 to the operation board 3. The transmitted code conversion table data is stored in the code conversion table memory 513.

Figures 10A, 10B:
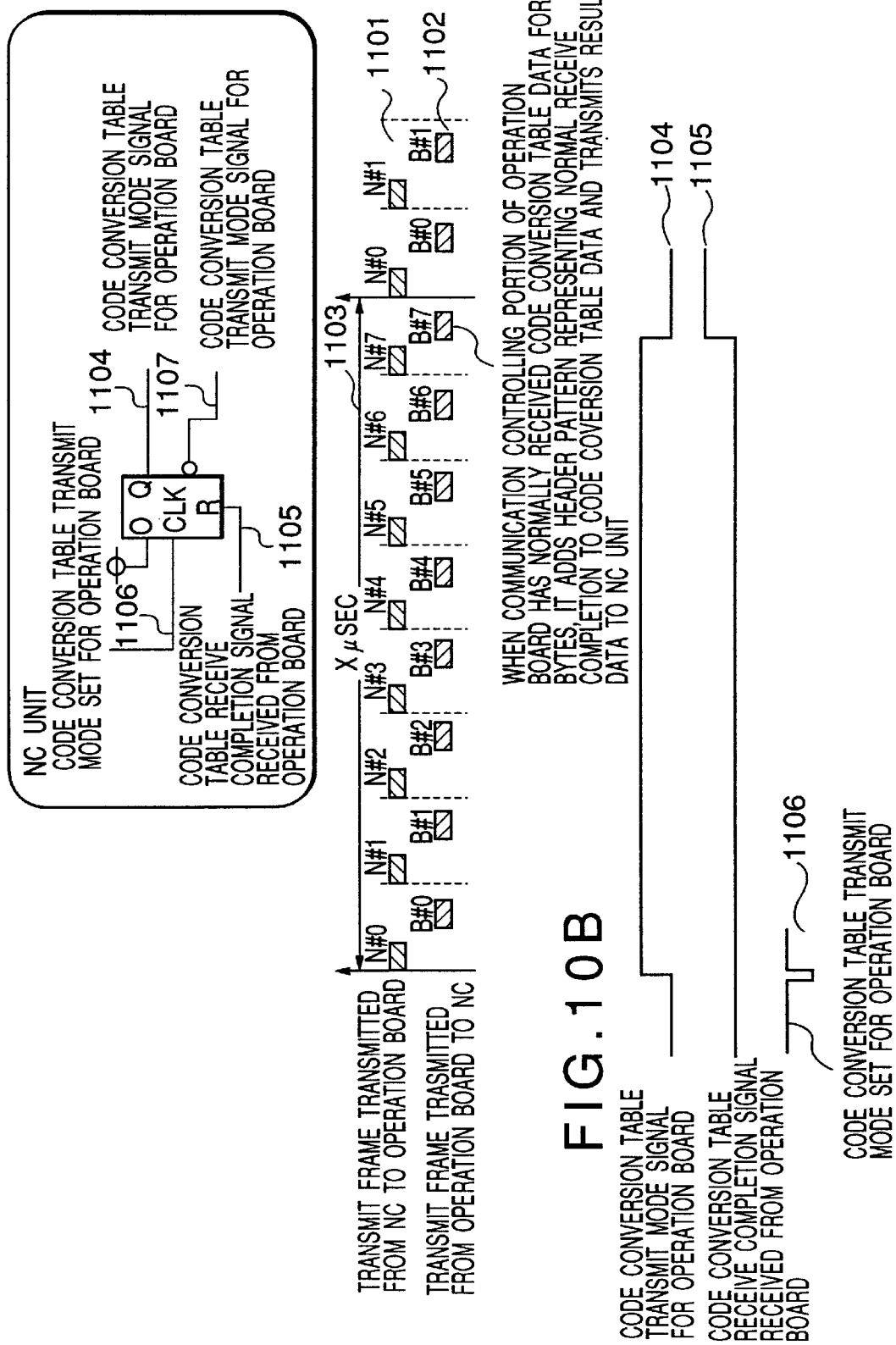
FIG. 10A is a schematic diagram showing a code conversion table receive mode controlling circuit for the operation board on the NC unit side according to the embodiment of the present invention.
FIG. 10B is a schematic diagram for explaining an operation timing.

FIG. 10(A) is a schematic diagram showing a code conversion table transmit mode controlling circuit for the operation board 3 in the NC unit 1. FIG. 10(B) is a schematic diagram for explaining an operation timing.

In FIG. 10, transmit frame 1101 is transmitted from the NC unit 1 to the operation board 3, and transmit frame 1102 is transmitted from the operation board 3 to the NC unit 1. Eight transmit/receive cycles 1103, which takes X in secs. are performed between the NC unit 1 and the operation board 3.

Next, the transmit operation of the code conversion table shown in FIGS. 10(A) and 10(B) will be described. After the system of the MPU 101 of the NC unit 1 is started, the MPU 101 analyzes the type of the operation board 3, stores 32 bytes of code conversion table data corresponding to the operation board 3 to the transmit data storing portion 43, and outputs a mode set signal 1106. When the mode set signal 1106 is input, as shown in FIG. 10(B), the NC unit 1 transmits code conversion table data at transmit frame timings N#0 to N#7 as a conversion table transmit mode signal 1104 of the operation board. The operation board 3 transmits a receive completion signal at transmit frame timing B#0 to B#7 as a code conversion table data receive completion signal 1105. The code conversion table data receive completion status 1107 of the operation board is set corresponding to the receive completion signal.

Although the timing chart shown in FIG. 10(B) shows timings of transmit/receive data between the NC unit 1 and the operation board 3, they also apply to transmit/receive data between the NC unit 1 and the remote I/O 2.

Figure 11A:
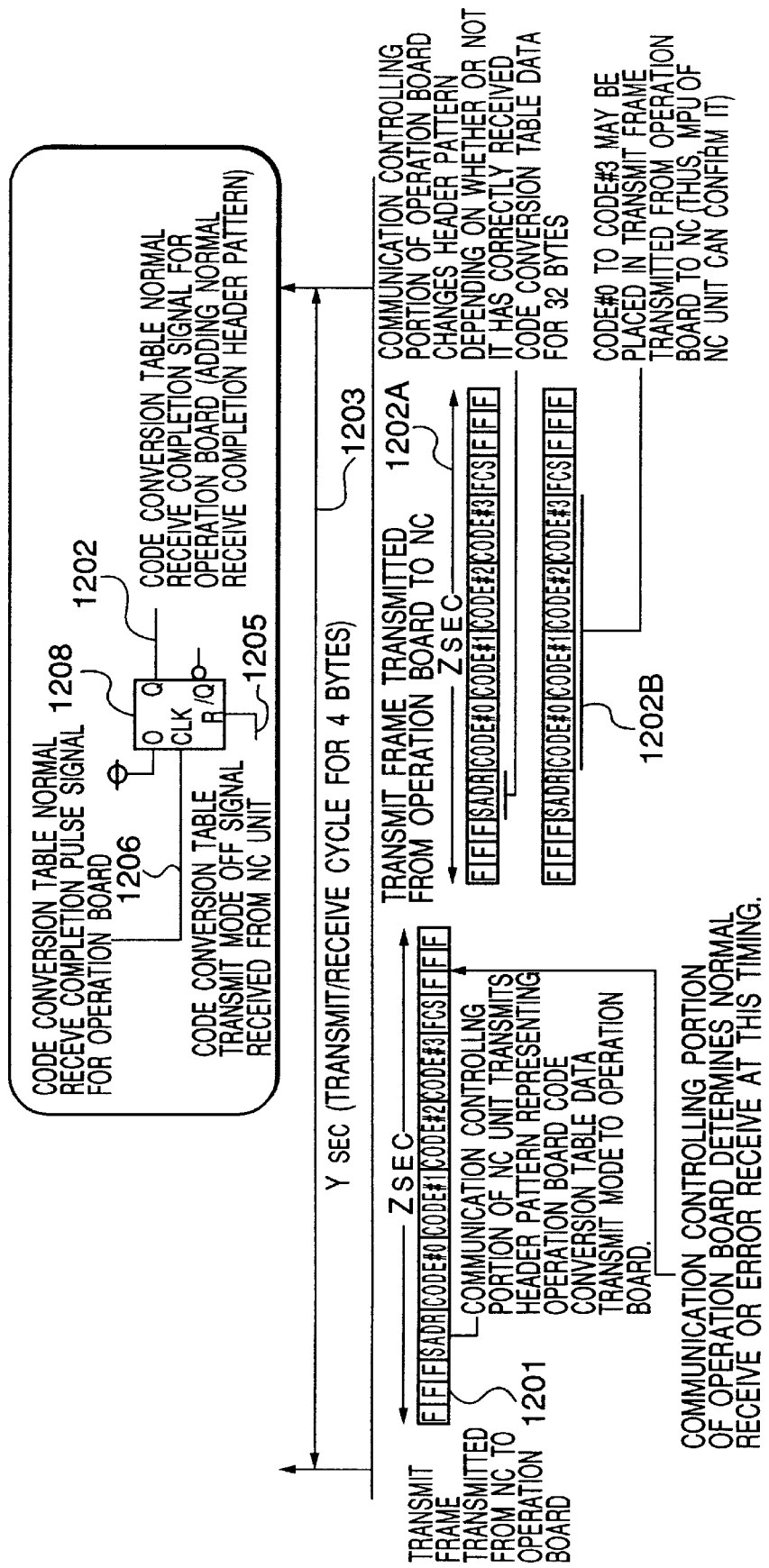
FIG. 11A is a schematic diagram showing a code conversion table receive mode controlling circuit on the operation board side according to the embodiment of the present invention.
Figure 11B:
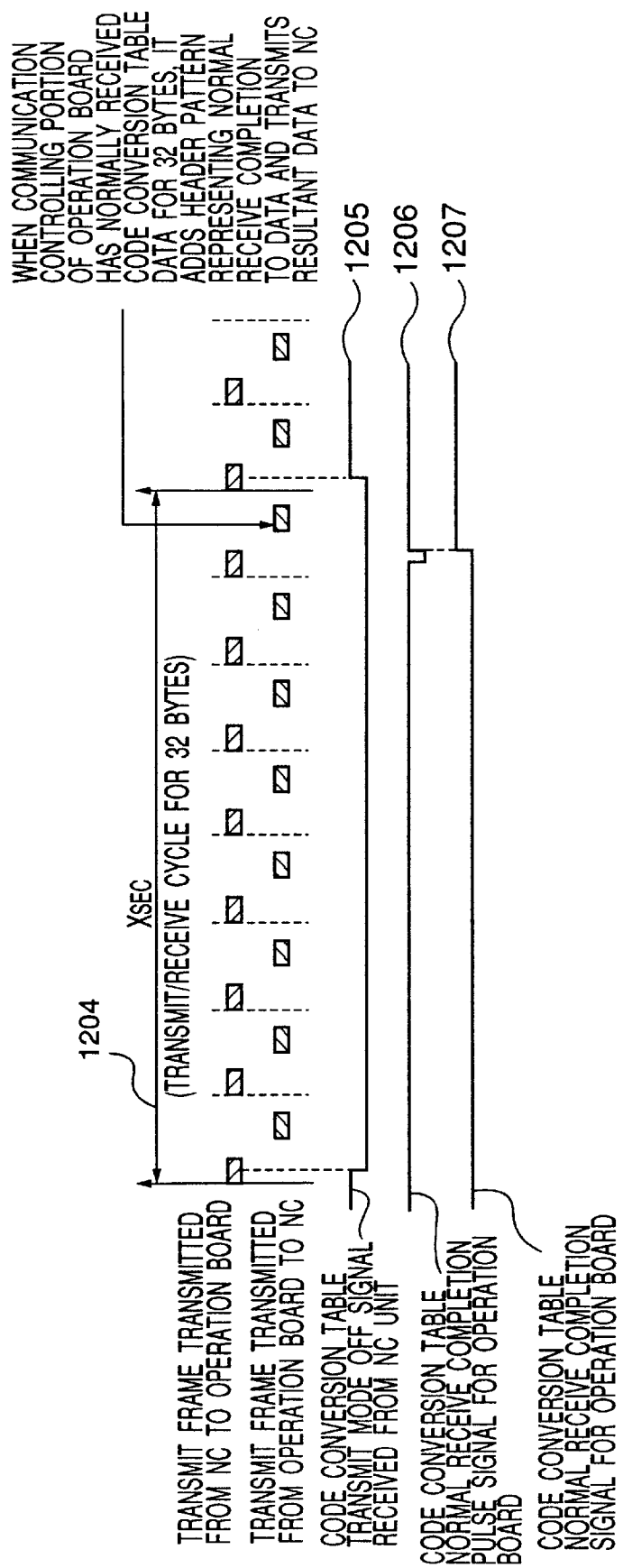
FIG. 11B is a schematic diagram for explaining an operation timing.

FIG. 11(A) is a schematic diagram showing a code conversion table receive mode controlling circuit for the operation board 3 according to the embodiment of the present invention. FIG. 11(B) is a schematic diagram for explaining an operation timing. In FIG. 11, reference numeral 1201 is a transmit frame transmitted from the NC unit 1 to the operation board 3. Reference numerals 1202A and 1202B are transmit frames transmitted from the operation board 3 to the NC unit 1. Reference numeral 1203 is one transmit/receive cycle performed between the NC unit 1 and the operation board 3. One transmit/receive cycle takes Y sec. Reference numeral 1204 is eight transmit/receive cycles performed between the NC unit 1 and the operation board 3. Reference numeral 1205 is a code conversion table transmit mode OFF signal detected from a frame received from the NC unit 1. Reference numeral 1206 is a code conversion table data normal receive completion signal for the operation board. Reference numeral 1207 is a code conversion table data normal receive completion signal for the operation board. Reference numeral 1208 is a flip-flop that generates the normal receive completion signal 1207.

Symbols in the transmit frame 1201 in FIG. 11(B) represent a data structure of a transmit frame transmitted from the NC unit 1 to the operation board 3 for each cycle. Symbols in the transmit frames 1202A and 1202B represent a data structure of a transmit frame transmitted from the operation board 3 to the NC unit 1. The code conversion table data receive controlling circuit of the operation board shown in FIG. 11(A) is equivalent to the code conversion table transfer controlling portion 519 shown in FIG. 9.

Next, a receiving operation of the code conversion table shown in FIGS. 11(A) and 11(B) will be described. When 32 bits of code conversion table data for the operation board are prepared by the NC unit 1, the NC unit 1 enters an operation board code conversion table transmit mode. Thus, the NC unit 1 transmits a transmit frame that represents the operation board code conversion mode to the operation board 3. The signal level of the code conversion table transmit mode OFF signal 1205 in the operation board 3 changes from HIGH to LOW. Thus, the operation board 3 starts receiving the operation board code conversion table.

When the operation board 3 has normally received the code conversion table data for 32 bytes, the signal level of the operation board code conversion table data normal receive completion pulse signal 1206 becomes LOW. Thus, the code conversion table data normal receive completion signal 1207 for the operation board is set.

When the code conversion table data normal receive completion signal 1207 for the operation board is set, the operation board 3 transmits to the NC unit 1 a transmit frame that represents that the code conversion table for the operation board has been normally received. When the NC unit 1 receives the signal that represents that the code conversion table for the operation board has been correctly received, it prepares the code conversion table data for the next 32 bytes, enters the operation board code conversion table transmit mode, and repeats the above-described operations.

Normally, the code conversion table data transferring process for the operation board performed from the NC unit 1 to the operation board 3 should be performed before the NC unit 1 enters the normal transmit mode. Thus, the transmit frame 1202A contains data BDID#0 to BDID#3 for which the NC unit 1 is in the connection ID request mode. However, when it should be confirmed that the code conversion table data for the operation board has been transferred from the NC unit 1 to the operation board 3, as represented by the transmit frame 1202B, the operation board code conversion table data CODE#0 to CODE#3 are looped back and transferred from the operation board 3 to the NC unit 1. The resultant data is stored in the receive data storing portion 44 of the NC unit 1. The MPU 101 of the NC unit 1 compares the data with the content stored in the transmit data storing portion 43.

FIG. 12 is a schematic diagram showing transmit/receive frames transmitted and received between the NC unit 1 and the remote I/O 2 and transmit/receive frames transmitted and received between the NC unit 1 and the operation board 3. In FIG. 12, transmit frame 1301 is transmitted from the NC unit 1 to the remote I/O 2 in the normal transmit mode. Transmit frame 1302 is transmitted from the remote I/O 2 to the NC unit 1 in the normal transmit mode. Transmit frame 1303 is transmitted from the NC unit 1 to the remote I/O 2 in the connection ID transmit mode corresponding to the connection ID request mode. Transmit frame 1304 is transmitted from the remote I/O 2 to the NC unit 1 in the connection ID transmit mode corresponding to the connection ID request mode. Transmit frame 1305 is transmitted from the NC unit 1 to the operation board 3 in the normal transmit mode. Transmit frame 1306 is transmitted from the operation board 3 to the NC unit 1 in the normal transmit mode. Transmit frame 1307 is transmitted from the NC unit 1 to the operation board 3 in the connection ID transmit mode corresponding to the connection ID request mode. Finally, transmit frame 1308 is transmitted from the operation board 3 to the NC unit 1 in the connection ID transmit mode corresponding to the connection ID request mode.

The data structure of each frame is the same. However, the header pattern and individual data of each frame varies, frame by frame. SADR represents a header pattern. In such a frame structure, since the data structure of each frame is common, the timings of the communication controlling portions of the NC unit 1, the remote I/O 2, and the operation board 3 can be easily controlled.

FIG. 13 is a schematic diagram for explaining header patterns transmitted by the communication controlling portions of the NC unit 1, the remote I/O 2, and the operation board 3. Each of the header patterns is composed of 16 bits. FF00 to FF07 of the 16 bits are used for the normal transmit mode of which a transmit frame is transmitted from the NC unit 1 to the remote I/O 2 or from the NC unit 1 to the operation board 3. 4900 to 4907 of the 16 bits are used for the connection ID request mode in which the connection ID request frame is transmitted from the NC unit 1 to the remote I/O 2 or from the NC unit 1 to the operation board 3. 4C00 to 4C07 of the 16 bits are used for the loop back mode of which a transmit frame is transmitted from the NC unit 1 to the remote I/O 2 or from the NC unit 1 to the operation board 3. 5400 to 5407 of the 16 bits are used for the code conversion table transmit mode of which a transmit frame is transmitted from the NC unit 1 to the operation board 3.

5200 of the 16 bits is used for a reply header pattern of which a transmit frame is normally received from each remote I/O 2 to the NC unit 1. 4500 of the 16 bits is used for a reply header pattern in the case where a transmit pattern is not correctly transmitted from each remote I/O 2 to the NC unit 1. 4A00 of the 16 bits is used for a header pattern of a transmit frame transmitted to the NC unit 1 in the case where the remote I/O removing switch 39 of the remote I/O 2 is operated and a signal is input. In addition, 4A00 is used for a header pattern of a transmit frame transmitted to the NC unit 1 in the case where the operation board removing switch 211 of the operation board 3 is operated and a signal is input.

4200 is used for a header pattern of a transmit pattern transmitted from the operation board 3 to the NC unit 1 in the case where the transmit pattern is normally received by the NC unit 1. 6500 is used for a header pattern of a transmit frame transmitted from the operation board 3 to the NC unit 1 in the case where the transmit pattern is not correctly received by the NC unit 1. Reference numeral 4600 is used for a header pattern in the case where one operation board code conversion table has been normally transmitted from the operation board 3.

The above-described header patterns are only examples. In other words, 16-bit header patterns can be designated corresponding to the application for use.

The header patterns of transmit frames transmitted from the NC unit 1 according to the embodiment can be categorized as the following four types.

| | |
|---|---|
| Normal transmit mode | FF00 to FF07 |
| Connection ID request communication mode | 4900 to 4907 |
| Loop-back mode | 4C00 to 4C07 |
| Operation board code conversion table transmit mode | 5400 to 5407 |

The header patterns of transmit frames transmitted from the remote I/O 2 can be categorized as the following three types.

| | |
|---|---|
| Normal receive state | 5200 |
| CRC error occurrence | 4500 |
| Remote I/O removing mode | 4A00 |

The header patterns of transmit frames transmitted from the operation board 3 can be categorized as the following four types.

| | |
|---|---|
| Normal receive state | 4200 |
| CRC error occurrence | 6500 |
| Normal receive completion state for one code conversion table for operation board | 4600 |
| Operation board removing mode | 4A00 |

In this embodiment, each of the header patterns is composed of 16 bits. However, according to the present invention, the number of bits for the header patterns is not limited to 16 bits.

A frame that is transmitted from the NC unit 1 to a particular remote I/O 2 or the operation board 3 and then received by the NC unit is automatically recognized as a receive frame received from the particular remote I/O 2 or the operation board 3. Thus, the header patterns for all remote I/Os and all operation boards can be commonly structured.

In addition, a header pattern of a transmit frame transmitted from the NC unit 1 in the loop-back mode is used to determine whether or not the NC unit 1 and the operation board 3 or the remote I/O 2 have been correctly connected. This function can be effectively used for a product shipment test.

Figure 14:
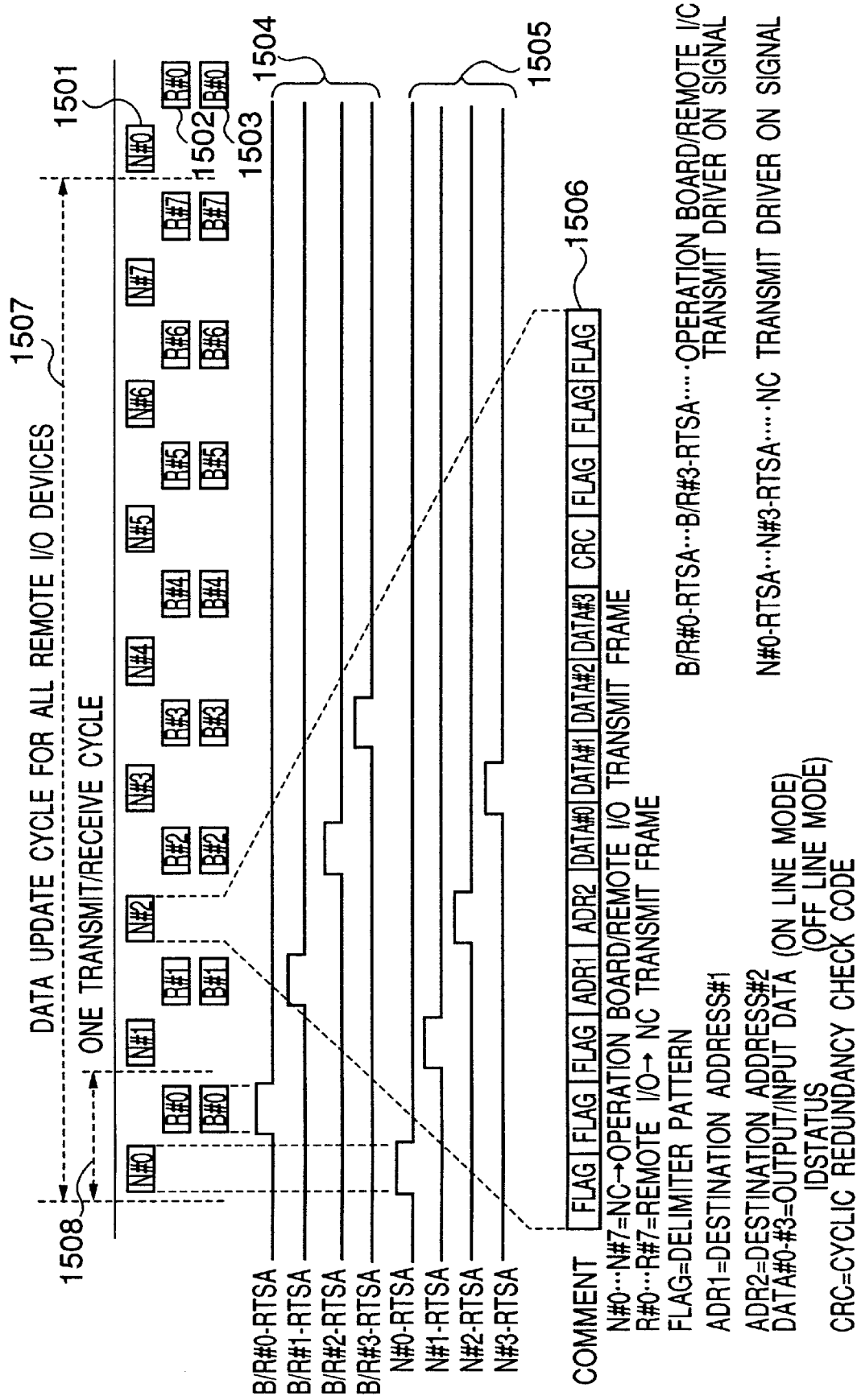
FIG. 14 is a schematic diagram showing a flow of data of transmit/receive frames transmitted and received between the NC unit and the operation board or between the NC unit and the remote I/O according to the embodiment.

FIG. 14 is a schematic diagram showing a flow of transmit/receive frames between the NC unit 1 and the operation board 3 or between the NC unit 1 and the remote I/O 2. In FIG. 14, transmit frame 1501 is transmitted from the NC unit 1 to the operation board 3 or the remote I/O 2, transmit frame 1502 transmitted from the remote I/O 2 to the NC unit 1, and transmit frame 1503 is transmitted from the operation board 3 to the NC unit 1. Reference numeral 1504 is a transmit ON signal of the operation board 3 and the remote I/O 2. Reference numeral 1505 is a transmit ON signal of the communication controlling portion of the NC unit 1. Reference numeral 1506 is a data structure of each of transmit frames (N#0 to N#7, R#0 to R#7, and B#0 to B#7) of the NC unit 1, the operation board 3, and the I/O 2. Reference numeral 1507 is a cycle interval for executing data transmission and reception with all remote I/Os 2 which are supposed to be connected to the NC unit 1. Reference numeral 1508 is one transmit/receive cycle for executing data transmission and reception performed between the NC unit 1 and the operation board 3 or the remote I/O 2.

In the transmit frame data structure 1506, FLAG is a pattern representing a boundary of a frame. ADR1 and ADR2 are header patterns. DATA#0 to DATA#3 are information regions including data transmitted by the NC unit 1, the operation board 3, and the remote I/O 2. CRC is a check code for detecting a frame error. The header patterns ADR1 and ADR2 are used for identifying each remote I/O (normally, identifying the connection ID request mode, the code conversion table transfer mode of which the code conversion table is transferred from the NC unit 1 to the operation board 3, designating the loop-back mode, determining a CRC error in data transmitted from the NC unit 1 to the operation board 3 or individual I/O 2, etc.).

In the embodiment, when the power is turned on, the serial communication port of the NC unit 1 automatically enters a mode for monitoring the connection ID status of the device being connected. The serial communication port automatically transmits to the operation board 3 or each remote I/O 2 a connection ID request communication frame that has information representing the ID status request mode for a predetermined period corresponding to a hardware timer without an intervention of the MPU 101 of the NC unit 1. Thus, the operation board 3 does not need to use an MPU, a ROM, and so forth for the operation board 3. Consequently, the structure of the system becomes simple.

The operation board 3 or the remote I/O 2 connected to the serial communication port of the NC unit 1 transmits a transmit frame having a header pattern that represents the type of the operation board 3 or the remote I/O 2 to the NC unit 1. The NC unit 1 detects the receive frame. Data of a transmit frame in the normal communication mode for the operation board 3 is different from that for the remote I/O 2. The length and timings of transmit/receive frames of the operation board 3 are the same as those of the remote I/O 2. Thus, the communication controlling portion of the NC unit 1 and the communication controlling portions of the operation board 3 and the remote I/O 2 can be accomplished with simple structures.

In addition, as long as the header pattern of the communication frame transmitted from the NC unit 1 represents a connection ID request mode, the operation board 3 or each remote I/O 2 transmits intrinsic ID information to the NC unit 1. The ID information contains a connection ID status code that represents the operation board 3 or the remote I/O 2. The communication controlling portion 109 of the NC unit 1 stores the connection ID status code transmitted from the operation board 3 or the remote I/O 2 to the receive data storing portion 44. The MPU 101 of the NC unit 1 reads the content of the receive data storing portion 44, confirms whether or not the operation board 3 or the remote I/O 2 has been connected to the serial communication port, and performs the operation corresponding to the operation board 3 or the remote I/O 2 connected to the NC unit 1.

Just after the NC unit 1 transmits a signal to the operation board 3 or a remote I/O 2, if the NC unit 1 cannot receive a reply signal therefrom, it determines that the relevant operation board 3 or the relevant remote I/O has not been provided. Thus, the NC unit 1 does not start the system operation as the NC unit 1. Consequently, after the NC unit 1 confirms that it has been connected to the operation board 3 or each remote I/O 2, the NC unit 1 performs the operation corresponding to the operation board 3 or each remote I/O 2.

When the NC unit 1 is connected to the operation board 3, if a communication disconnected state takes place without an operation that represents that the user removes the operation board 3, the NC unit 1 determines that this situation is an alarm and transmits an alarm signal to the LED display device of the NC unit 1 and the display device of the operation board 3. Thus, the operator can be informed of the communication disconnected state.

Second Embodiment

Figure 15:
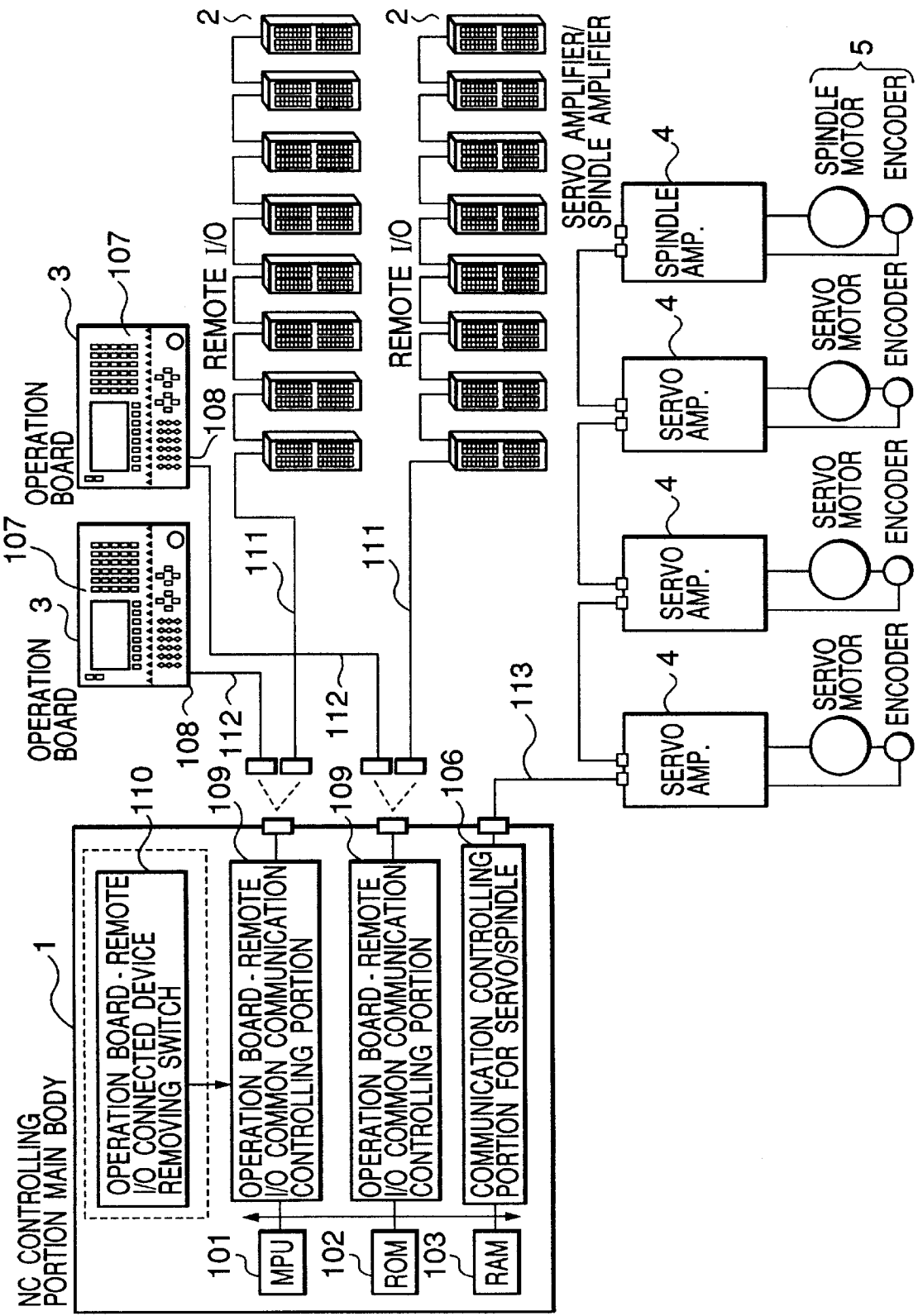
FIG. 15 is a block diagram showing a structure of an operation board—remote I/O communication controlling system according to another embodiment of the present invention.

FIG. 15 is a block diagram showing a structure of the operation board—remote I/O communication controlling system according to a second embodiment of the present invention. The NC unit 1 is provided with a plurality of operation board—remote I/O common communication controlling portions 109. In addition, a plurality of operation boards 3 and remote I/Os 2 are disposed.

In the structure shown in FIG. 15, since a plurality of operation board—remote I/O common communication controlling portions 109 are disposed, a system with a plurality of operation boards 3 can be simply accomplished. Even if the number of operation boards 3 is decreased to one and another remote I/O 2 is extended, the system can be easily changed.

As set forth above, the present invention provides an operation board—remote I/O communication controlling system having an operation board or a remote I/O in association with a controlling unit for controlling a machine tool, the frame length and communication intervals of data transmitted/received between the controlling unit and the operation board being the same as the frame length and communication intervals of data transmitted/received between the controlling unit and the remote I/O. Thus, the communication control between the controlling unit and the operation board and between the controlling unit and the remote I/O can be unified and simplified.

The operation board or the remote I/O can be connected to the same serial communication line of the controlling unit. Thus, the communication controlling portion of the NC unit for the operation board and the communication controlling portion of the remote I/O can be commonly structured. When the remote I/O is extended, it is not necessary to extend the communication controlling portion. As a result, the flexibility of the system structure is improved.

The controlling unit is typically a NC unit. Data transmitted/received between the NC unit and the operation board is performed by transmitting display data from the NC unit to a display portion of the operation board and by transmitting operation key input data from the operation board to the NC unit. Thus, data can be easily transmitted and received between the NC unit and the operation board.

The frame length is preferably several bytes. Thus, data is transmitted/received between the controlling unit and the operation board and between the controlling unit and the remote I/O at high speed. Consequently, the data process can be quickly performed. As a result, the communication control between the controlling unit and the operation board and between the controlling unit and the remote I/O can be easily unified.

A frame transmitted from the operation board to the NC unit has a different identification code from that of a frame transmitted from the remote I/O to the NC unit. Thus, it can be easily determined which of the operation board or the remote I/O has been connected to the NC unit.

A communication controlling portion of the controlling unit is adapted for transmitting a communication frame that detects the type of an operation board connected to the controlling unit when an operation board removing switch of the operation board or a connected device removing switch of the controlling unit is operated so as to remove the operation board from the controlling unit or when the connected device removing switch of the controlling unit or a remote I/O removing switch of the remote I/O is operated so as to remove the remote I/O from the controlling unit. Thus, when the operator removes an operation board or a remote I/O from the NC unit, he or she can connect an operation board or a remote I/O to the NC unit without need to stop the system of the NC unit.

An address signal of which operation key input data of the operation board is scanned and read depends on the frame identification code transmitted from the NC unit to the operation board. Thus, the operation board does not need to provide special hardware such as an MPU and a ROM. Consequently, the system structure is simplified. As a result, the cost of the system can be reduced.

The operation key input data of the operation board is transmitted to the NC unit when a frame is transmitted from the NC unit to the operation board. Thus, when operation key scan input data is transmitted from the operation board to the NC unit, it is not necessary to add special information to a transmit frame. As a result, the hardware of the operation board can be simply structured.

The communication controlling portion of the NC unit as the controlling unit is adapted for transmitting a communication frame for detecting the type of an operation board connected to the NC unit, the operation board being adapted for transmitting information representing the type thereof to the NC unit, the NC unit being adapted for transmitting code conversion table data corresponding to the operation key input data of the operation board to the operation board based on the transmitted information and storing the code conversion table data in a memory of the operation board. Thus, code conversion table data that is required for each operation board can be totally controlled as data of the NC unit. Consequently, data can be easily handled.

In addition, the operation board of the preferred embodiments has an operation key input code conversion table, and the code is converted by hardware. Thus, it is not necessary to provide the operation board with an MPU and to perform the code conversion software process by the MPU. Consequently, it is not necessary to develop software for the operation board. When a product shipment test is performed with a test unit that simulates the operation board code conversion data transferring process of the NC unit, the test can be performed on the operation board.

The communication controlling portion of the operation board has a first mode for extracting a highest priority operation key, converting the highest priority operation key into a code corresponding to the code conversion table data stored in the memory of the operation board, and transmitting the converted data to the NC unit and a second mode for directly transmitting the input data of the operation key to the NC unit when a plurality of operation keys are operated in the case that a frame is transmitted from the NC unit to the operation board and the operation key input data of the operation board is scanned and read. Thus, both of the following two modes can be supported. The first mode has a priority designated for each operation key as an operation key input, and only an operation key input with the highest priority is transmitted to the NC unit. The second mode has all key input information transmitted to the NC unit upon one operation key scanning. The two modes can be selected corresponding to the state of the operation key scan signal. Consequently, the system can be applied for use with various operation boards.

The code conversion table data is transmitted from the NC unit to the operation board in such a manner that the code conversion table data is divided into a plurality of frames. The address of the code conversion table data stored in the memory depends on the identification code of each of the frames. Thus, along with the advantage of a high speed process with short transmit/receive frames used in the remote I/O, code conversion table data can be transmitted to the operation board. The variation of the header pattern of a transmit frame transmitted from the NC unit can be used for designating an address of the code conversion memory of the operation board in addition to designating the station number of the remote I/O. Consequently, the circuit structure of the operation board can be simplified.

The operation board is adapted for transmitting a frame that has a special identification code to the NC unit whenever the code conversion table data is normally transmitted as a plurality of frames from the NC unit. Thus, it can be determined that the code conversion table data has been correctly transferred from the NC unit to the operation board corresponding to a transmit frame transmitted from the operation board. Consequently, the operation board can be prevented from incorrectly converting a code.

The identification code of a frame transmitted from the NC unit is restored to a normal identification code in the case that the code conversion table data is transmitted as a plurality of frames from the NC unit, when the identification code of each of the frames is transmitted with a special identification code and the NC unit receives a frame that represents the normal transmission of the code conversion table data from the operation board. Thus, code conversion table data can be securely handshaked between the NC unit and the operation board.

An address displayed on the display portion of the operation board depends on the identification code of a frame of the display data transmitted from the NC unit to the operation board. Thus, the header pattern of the transmit frame transmitted from the NC unit can be used for the output address signal of the display portion of the LED or the like of the operation board so as to select the station number of the remote I/O. Consequently, it is not necessary to provide the operation board with special hardware. As a result, the system structure can be simplified.

It should be understood that the present invention is not limited to any particular embodiment disclosed herein. There are many other variations to the examples discussed above, which would still be within the scope and spirit of the invention which is defined by the following claims.

What is claimed is:

1. An operation board—remote I/O communication controlling system for a machine tool controlling network, said network having an operation board for accepting input data from a user, a remote I/O for allowing communications with a remote machine tool, and at least one communications link connected to at least one of said operation board and said remote I/O, said communication controlling system comprising:

a controlling unit connected to said communications link for controlling said machine tool, said controlling unit operable to communicate with said operation board and said remote I/O using data formats such that frame lengths and communication intervals of data exchanged between the controlling unit and the operation board are the same as frame lengths and communication intervals of data exchanged between the controlling unit and the remote I/O, wherein said communications link consists essentially of a serial communication line.

2. The operation board—remote I/O communication controlling system as set forth in claim 1, wherein said communications link comprises one of wire and cable.

3. The operation board—remote I/O communication controlling system as set forth in claim 1, wherein said communications link is a wireless link.

4. The operation board—remote I/O communication controlling system as set forth in claim 1, wherein the operation board and the remote I/O are operable to communicate with the controlling unit over the same serial communication link.

5. The operation board—remote I/O communication controlling system as set forth in claim 4, wherein only one of said operation board and said remote I/O can communicate on the same communications link at a time.

6. The operation board—remote I/O communication controlling system as set forth in claim 4, wherein the controlling unit comprises a numerical control (NC) unit, and wherein data exchanged between the NC unit and the operation board is performed by transmitting display data from the NC unit to a display portion of the operation board and by transmitting operation key input data from the operation board to the NC unit.

7. The operation board—remote I/O communication controlling system as set forth in claim 4, wherein the frame length is more than one byte.

8. The operation board—remote I/O communication controlling system as set forth in claim 6, wherein frames transmitted from the operation board to said NC unit has a different identification code from the identification code of frames transmitted from the remote I/O to said controlling unit.

9. The operation board—remote I/O communication controlling system as set forth in claim 4, wherein said controlling unit comprises a numerical controlling unit (NC) having a communication controlling portion which is operable to detect the type of operation board connected to the controlling unit.

10. The operation board—remote I/O communication controlling system as set forth in claim 9, wherein said communication controlling portion detects the type of operation board by interpreting at least one frame received from said operation board.

11. The operation board—remote I/O communication controlling system as set forth in claim 8, wherein said operation board scans and reads operation key input data based upon an address signal derived from the frame identification code transmitted from the controlling unit to the operation board.

12. The operation board—remote I/O communication controlling system as set forth in claim 11, wherein said operation board transmits operation key input data to the NC unit after receiving a frame from the NC unit instructing said operation board to transmit said operation key input data.

13. The operation board—remote I/O communication controlling system as set forth in claim 6, wherein the communication controlling portion of the NC unit is operable to transmit a communication frame for detecting the type of operation board connected to the NC unit, the operation board is operable to transmit information representing the type of operation board to the NC unit, the NC unit is operable to transmit to the operation board code conversion table data corresponding to the operation key input data based on the type of operation board, and said operation board is operable to store the code conversion table data in a memory.

14. The operation board—remote I/O communication controlling system as set forth in claim 13, wherein said operation board has a communication controlling portion having a first mode for extracting a highest priority operation key, converting the highest priority operation key into a code corresponding to the code conversion table data stored in the memory of the operation board, and transmitting the converted data to the NC unit, and a second mode for directly transmitting the input data of the operation key to the NC unit after a predetermined number of operation keys are operated, scanned, and read by said operation board and a frame has been transmitted from the NC unit to the operation board.

15. The operation board—remote I/O communication controlling system as set forth in claim 14, wherein the code conversion table data is transmitted from the NC unit to the operation board such that the code conversion table data is divided into a plurality of frames, and wherein the address of the code conversion table data stored in the memory depends on the identification code of each of the frames.

16. The operation board—remote I/O communication controlling system as set forth in claim 15, wherein the operation board is operable to transmit a frame that has a special identification code to the NC unit whenever the code conversion table data is normally transmitted as a plurality of frames from the NC unit.

17. The operation board—remote I/O communication controlling system as set forth in claim 16, wherein the identification code of a frame transmitted from the NC unit is restored to a normal identification code after the identification code of each of the frames is transmitted with a special identification code and the NC unit receives a frame that represents the normal transmission of the code conversion table data from the operation board.

18. The operation board—remote I/O communication controlling system as set forth in claim 6, wherein said display portion of the operation board displays an address based upon an identification code of a display data frame transmitted from the NC unit to the operation board.

19. The operation board—remote I/O communication controlling system as set forth in claim 8, wherein said display portion of the operation board displays an address based upon the identification code transmitted from the NC unit to the operation board.

20. A machine tool controlling network comprising:

an operation board for accepting input data from a user;

a remote I/O for allowing communications with a remote machine tool;

at least one communications link consisting essentially of a serial communication line and connected to at least one of said operation board and said remote I/O; and a controlling unit connected to said communications link for controlling said machine tool, said controlling unit operable to communicate with said operation board and said remote I/O using data formats such that frame lengths and communication intervals of data exchanged between the controlling unit and the operation board are the same as frame lengths and communication intervals of data exchanged between the controlling unit and the remote I/O, thereby allowing said operation board and said remote I/O to communicate with said controlling unit on the same communications link.

21. A machine tool controlling network according to claim 20, wherein only one of said operation board and said remote I/O can communicate on the same communications link at a time.

\* \* \* \* \*